US012664872B2

(12) United States Patent
Liu et al.

(10) Patent No.: US 12,664,872 B2
(45) Date of Patent: Jun. 23, 2026

(54) INTRUSION DETECTION SYSTEM AND INTRUSION DETECTION METHOD

(71) Applicant: DELTA ELECTRONICS, INC., Taoyuan City (TW)

(72) Inventors: Chia-Lung Liu, Taoyuan City (TW); Kuo-Hao Sung, Taoyuan City (TW); Hsin-Chih Wang, Taoyuan City (TW); Ting-Wu Ho, Taoyuan City (TW); Kuei-Li Huang, Taoyuan City (TW)

(73) Assignee: DELTA ELECTRONICS, INC., Taoyuan City (TW)

( * ) Notice: Subject to any disclaimer, the term of this patent is extended or adjusted under 35 U.S.C. 154(b) by 102 days.

(21) Appl. No.: 18/785,770

(22) Filed: Jul. 26, 2024

(65) Prior Publication Data

US 2025/0037571 A1 Jan. 30, 2025

Related U.S. Application Data

(60) Provisional application No. 63/529,430, filed on Jul. 28, 2023.

(51) Int. Cl.

| | |
|---|---|
| ***G08B 26/00*** | (2006.01) |
| ***G08B 25/00*** | (2006.01) |
| ***G16Y 40/10*** | (2020.01) |

(52) U.S. Cl.
CPC ......... *G08B 26/004* (2013.01); *G08B 25/007* (2013.01); *G16Y 40/10* (2020.01)

(58) Field of Classification Search
CPC ........................... G16Y 40/10; G08B 13/1609; G08B 13/2462; G08B 13/2491; H04W 4/38; G01S 7/415; G01S 13/42; G01S 13/56
See application file for complete search history.

(56) References Cited

U.S. PATENT DOCUMENTS

| | | | | |
|---|---|---|---|---|
| 6,879,257 B2 | 4/2005 | Hisano et al. | | |
| 10,004,076 B1 | 6/2018 | Griesdorf et al. | | |
| 2003/0164763 A1* | 9/2003 | Hisano | G08B 13/181 | 340/8.1 |

(Continued)

OTHER PUBLICATIONS

Examination Report dated Jun. 18, 2025 of the corresponding European patent application No. 24191092.6.

(Continued)

*Primary Examiner* — Mirza F Alam

(74) *Attorney, Agent, or Firm* — HDLS IPR SERVICES; Chun-Ming Shih

(57) ABSTRACT

An intrusion detection system and intrusion detection method are provided. The intrusion detection system includes multiple IoT devices and a central control device. The central control device is configured to obtain multiple sensing pairs from a paired combination of the multiple IoT devices; create a sensing-pair list including the multiple sensing pairs and features of each sensing pair; obtain multiple first pairs whose features satisfy a first feature condition from the sensing-pair list; dynamically schedule the multiple IoT devices to send and receive signals in a time sharing fashion to obtain a first sensing signal of each first pair; and based on a paired node of the multiple first pairs, count a first status code and a second status code of the multiple first pairs to which each paired node belongs, to determine whether any intrusion condition occurs.

20 Claims, 17 Drawing Sheets

(56) References Cited

U.S. PATENT DOCUMENTS

| | | | | |
|---|---|---|---|---|
| 2017/0208079 | A1* | 7/2017 | Cammarota | H04L 63/1425 |
| 2019/0146076 | A1 | 5/2019 | Kravets et al. | |
| 2019/0236493 | A1* | 8/2019 | Cam-Winget | G06F 18/24 |
| 2020/0342702 | A1* | 10/2020 | Loganathan | G07C 9/27 |
| 2024/0171599 | A1* | 5/2024 | Kwon | H04L 63/1425 |

OTHER PUBLICATIONS

Search Report dated Dec. 9, 2024 of the corresponding European patent application No. 24191092.6.

* cited by examiner

INTRUSION DETECTION SYSTEM AND INTRUSION DETECTION METHOD

CROSS-REFERENCE TO RELATED APPLICATION

This patent application claims the benefit of U.S. Provisional Patent Application No. 63/529,430, filed Jul. 28, 2023, which is incorporated by reference herein.

BACKGROUND OF THE DISCLOSURE

Technical Field

The disclosure generally relates to a detection system and a detection method, and particularly to an intrusion detection system and an intrusion detection method.

Description of Related Art

Current intrusion detection systems utilize paired wireless sensing devices, such as paired infrared sensors, where one sensing device serves as the sender and the other as the receiver, transmitting infrared signals from the sender to the receiver. When the receiver does not detect the infrared signal, it indicates that the infrared beam has been obstructed. In other words, intrusion detection systems detect intrusions by monitoring whether the wireless sensing signal between paired devices has been obstructed. However, these wireless sensing devices must be paired in fixed combinations, limiting the detection region and potentially creating blind spots. To expand the detection coverage, additional pairs of sensing devices are required, leading to increased costs.

Furthermore, the current intrusion detection systems lack flexibility due to the fixed combinations of wireless sensing devices. To widen the detection coverage, increasing the distance between paired wireless sensing devices is one approach, but there may be delays in identifying the precise position of intruders, even if their presence is detected.

Therefore, how to solve issues such as blind spots and delayed response times in current intrusion detection systems is a priority for a person with ordinary skills in the art.

SUMMARY OF THE DISCLOSURE

One of the exemplary embodiments is to provide an intrusion detection system including multiple IoT devices and a central control device. Each of the IoT devices are disposed respectively on a space position and configured to receive and send a sensing signal. The central control device is communicatively connected to the multiple IoT devices and configured to: obtain multiple sensing pairs from a paired combination of the multiple IoT devices; make the multiple IoT devices of each of the multiple sensing pairs send and receive signals to obtain features of the multiple sensing pairs; create a sensing-pair list comprising the multiple sensing pairs and the features of each of the multiple sensing pairs; obtain multiple first pairs whose features satisfy a first feature condition from the sensing-pair list; schedule dynamically the multiple IoT devices of the multiple first pairs to send and receive signals in a time sharing fashion to obtain a first sensing signal of each of the multiple first pairs; if determining that the first sensing signal satisfies a suspected intrusion condition, tag the first pair with a first status code, otherwise tag the first pair with a second status code; and based on a paired node of the multiple first pairs, count respectively the first status codes and the second status codes of the multiple first pairs to which the paired node belongs, to determine whether any intrusion condition occurs at the space position close to the paired node.

One of the exemplary embodiments is to provide an intrusion detection method applying to multiple IoT devices and a central device. Each of the multiple IoT devices is disposed respectively on a space position and configured to send and receive a sensing signal. The central control device connected to the multiple IoT devices receives the sensing signal. The intrusion detection method includes steps of: obtaining multiple sensing pairs from a paired combination of the multiple IoT devices; making the multiple IoT devices of each of the multiple sensing pairs send and receive signals to obtain features of the multiple sensing pairs; creating a sensing-pair list comprising the multiple sensing pairs and the features of each of the multiple sensing pairs; obtaining multiple first pairs whose features satisfy a first feature condition from the sensing-pair list; scheduling dynamically the multiple IoT devices of the multiple first pairs to send and receive signals in a time sharing fashion to obtain a first sensing signal of each of the multiple first pairs; if determining that the first sensing signal satisfies a suspected intrusion condition, tagging the first pair with a first status code, otherwise tagging with a second status code; and based on a paired node of the multiple first pairs, counting respectively the first status code and the second status code of the multiple first pairs that the paired node belongs, to determine whether any intrusion condition occurs at the space position close to the paired node.

DETAILED DESCRIPTION

Figure 1:
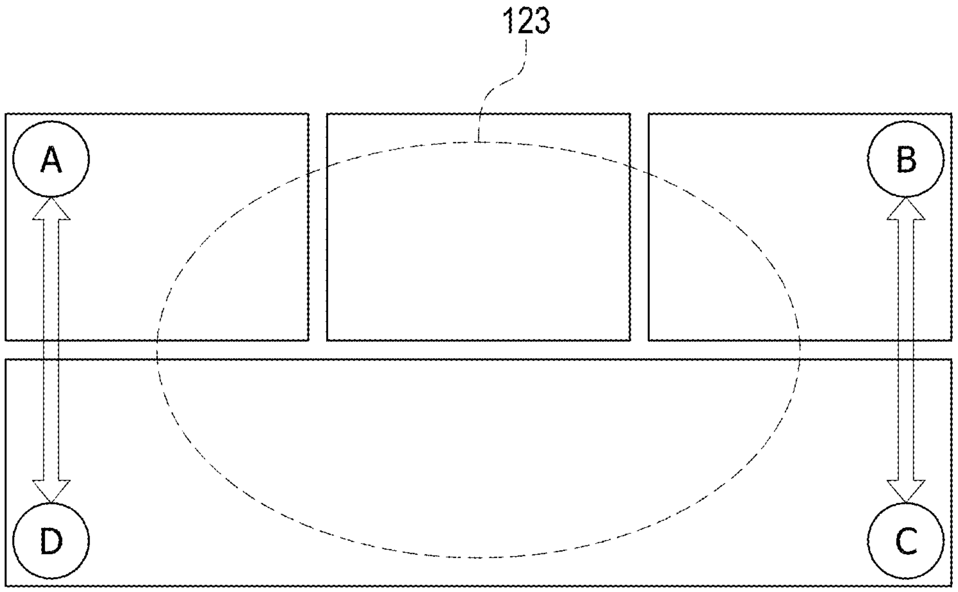
FIG. 1 is a schematic diagram illustrating a blind spot when an intrusion detection system works in some situations.

Reference will now be made in detail to the present embodiments of the disclosure, examples of which are illustrated in the accompanying drawings. Wherever possible, the same reference numbers are used in the drawings and the description to refer to the same or like parts.

The technical terms "first", "second" and the similar terms are used to describe elements for distinguishing the same or similar elements, components, areas, layers, or operations and are not intended to limit the technical elements and the order of the operations in the present disclosure. Furthermore, the element symbols/alphabets can be used repeatedly in each embodiment of the present disclosure. The same and similar technical terms can be represented by the same or similar symbols/alphabets in each embodiment. The repeated symbols/alphabets are provided for simplicity and clarity and they should not be interpreted to limit the order or relation of the technical terms among the embodiments unless the context indicates the order or sequence.

FIG. 1 is a schematic diagram illustrating a blind spot when an intrusion detection system works in some situations.

Multiple Internet of Things devices (hereinafter referred to as IoT devices) are disposed in a living environment, such as the IoT devices A, B, C, and D. IoT devices A, B, C, and D may be a lamp, a plug, a refrigerator, or other smart appliances. In other sensing environments, the IoT devices A, B, C, and D may be devices having wireless communication modules and configured to send and receive any wireless signals.

As shown in FIG. 1, the IoT device A is paired with the IoT device D, and the IoT device B is paired with the IoT device C. This sensing implementation has a short sensing distance and is capable of detecting the intruder immediately but cannot detect a space area 123 where there is a blind spot.

Figure 2:
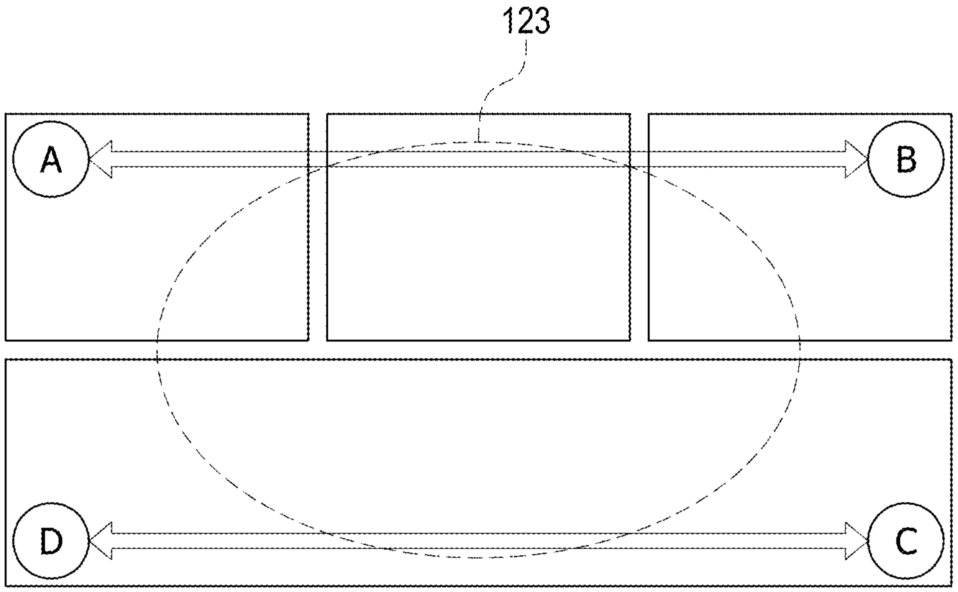
FIG. 2 is a schematic diagram illustrating that the intrusion detection system is unable to detect the intruder immediately when working in another situation.

FIG. 2 is a schematic diagram illustrating that the intrusion detection system is unable to detect the intruder immediately when working in another situation.

The IoT device A is paired with IoT device B, and the IoT device C is paired with the IoT device D. This sensing implementation can detect a larger sensing area to prevent the blind spot; however, the response time is delayed so long that the actual intrusion condition cannot be reflected when some intruders are detected in the space area 123.

Figure 3:
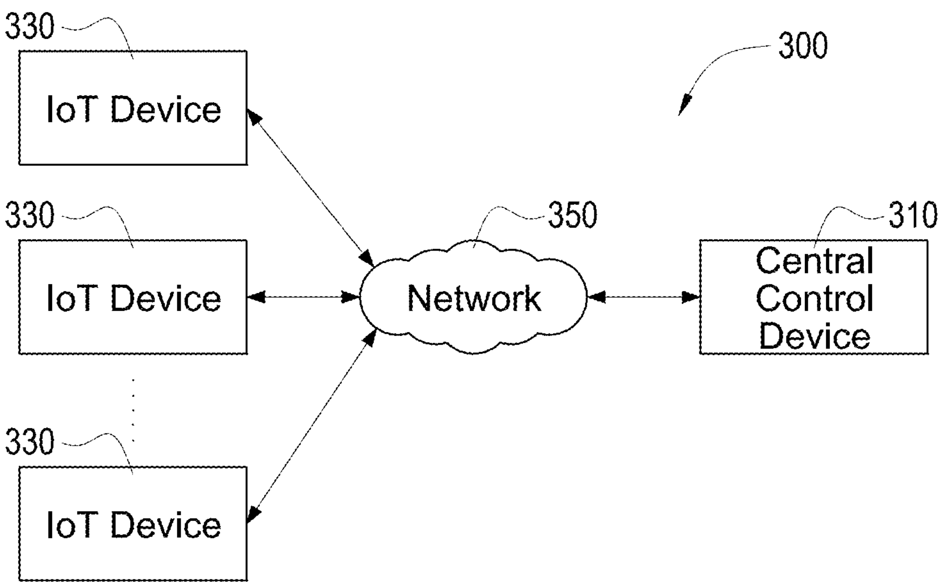
FIG. 3 is a schematic diagram of an intrusion detection system according to one embodiment of the present disclosure.

FIG. 3 is a schematic diagram of an intrusion detection system according to one embodiment of the present disclosure.

The intrusion detection system 300 includes a central control device 310 and multiple IoT devices 330.

The IoT device 330 has an identifier that is applied to identify the IoT device 330. The IoT device 330 may be a sender to send a sensing signal and also be a receiver to receive the sensing signal sent by another IoT device 330.

The central control device 310 receives data from each IoT device 330 by a network 350 and controls the multiple IoT devices 330. The data of the IoT device 330 that the central control device 310 receives may be the identifier of the IoT device 330 and the sensing signals that the IoT device 330 receives when it is a receiver.

In one embodiment, when all the IoT devices 330 are regarded as multiple nodes, and all pairs among all the IoT devices 330 are regarded as multiple edges of the nodes, all paired combinations among all the IoT devices 330 form a complete graph. In other words, the central control device 310 collects the sensing signals among each IoT device 330 communicating with other IoT devices 330 as much as they can.

The central control device 310 sets a device role for each IoT device 330. The IoT device 330 sends and receives signals based on the device role. The device role may be a station (STA) mode, an access point (AP) mode, or a sniffer mode. In one embodiment, the device role is implemented by the Wi-Fi wireless network technique. For example, the IoT device 330 which is configured to perform the STA mode receives the Service Set Identifier (SSID) that is broadcasted by the IoT device 330 which is configured to perform the AP mode to connect with the IoT device 330 of the AP mode and send the sensing signal to the IoT device 330 of the AP mode. The IoT device 330 of the AP mode receives respectively the sensing signals from the IoT device 330 of the STA mode based on the wireless communication protocol. The IoT device 330 of the sniffer mode duplicates packets captured in the Network 350 to receive the sensing signal sent by other IoT device 330.

Figure 4:
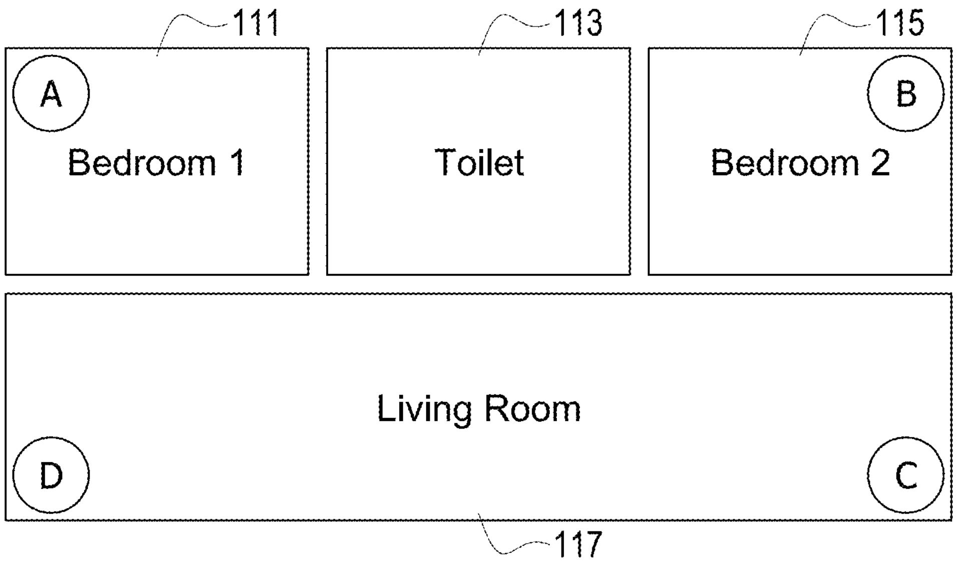
FIG. 4 is a schematic diagram of an implementation scenario where an IoT device is disposed according to one embodiment of the present disclosure.

FIG. 4 is a schematic diagram of an implementation scenario where an IoT device is disposed according to one embodiment of the present disclosure.

The implementation scenario may be a living environment including bedrooms 111 and 115, a toilet 113, and a living room 117. Four IoT devices A, B, C, and D are disposed in the living environment. The IoT device A is disposed in a corner of the bedroom 111; the IoT device B is disposed at a corner of the bedroom 115; the IoT devices C and D are disposed respectively in two corners of the living room 117.

The IoT devices A, B, C, and D have a sensing function or an identification function and send the sensed or measured data to the central control device 310 (through a gateway or the network 350). The IoT devices A, B, C, and D may be a refrigerator, a TV, an air conditioner, a rice cooker, a plug, an electricity meter, a gas meter, a water meter, or the other internet-enabled smart appliances.

For one thing, the IoT devices A, B, C, and D are devices performing the sensing or identifying function; for another, they perform in the STA mode, the AP mode, or the sniffer mode to send and receive the sensing signal through the communication module of the IoT devices.

The central control device 310 makes any paired combination of the IoT devices A, B, C, and D and performs an intrusion detection incorporated with a dynamical timeshare sensing.

Figure 5:
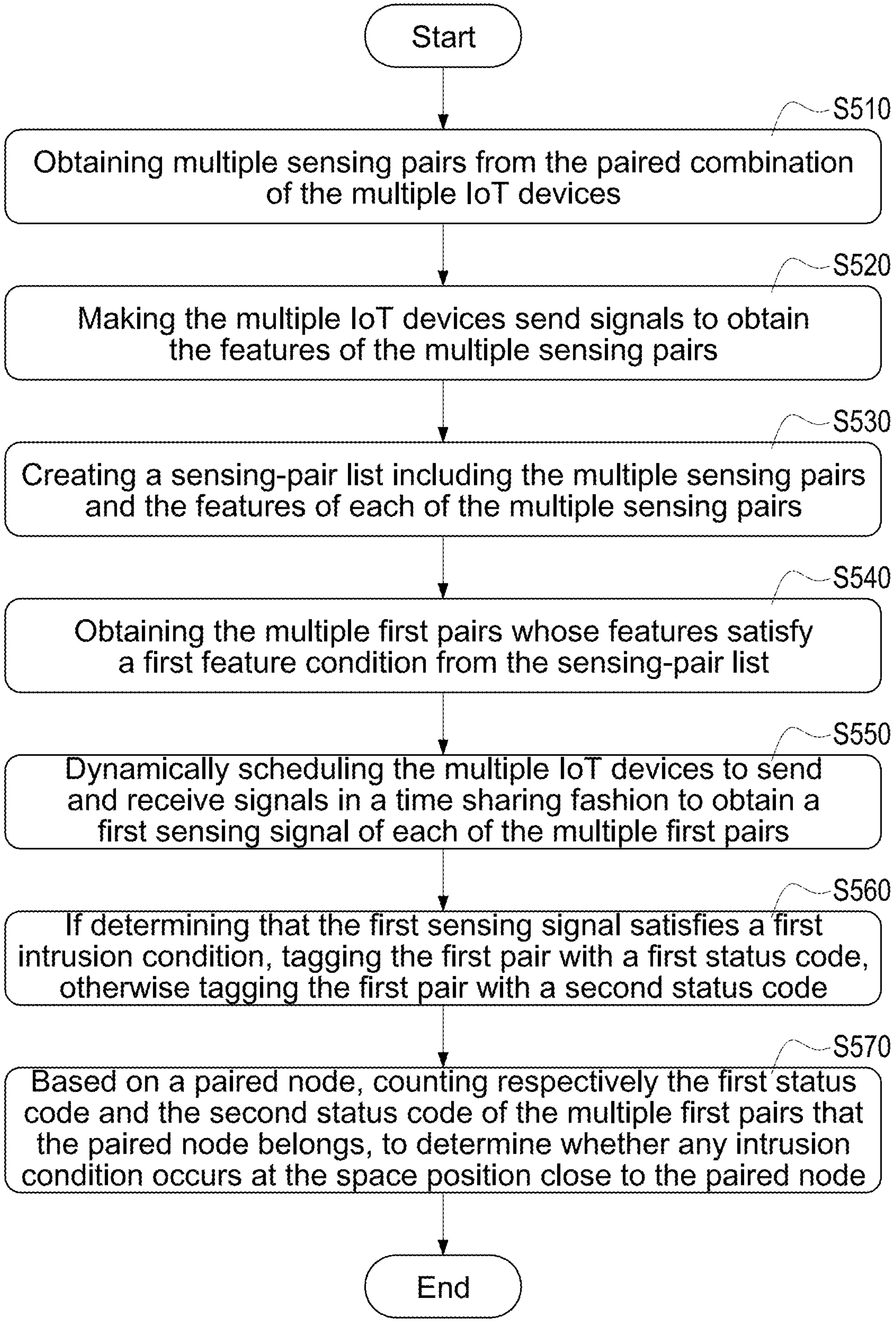
FIG. 5 is a flowchart illustrating an intrusion detection method according to one embodiment of the present disclosure.

FIG. 5 is a flowchart illustrating an intrusion detection method according to one embodiment of the present disclosure.

The intrusion detection method is applied to the multiple IoT devices 330 and the central control device 310 (FIG. 3). Each IoT device 330 is disposed on a space position and configured to send and receive the sensing signals.

In step S510, the central control device 310 obtains multiple sensing pairs from the paired combination of the multiple IoT devices.

In step S520, the central control device 310 makes the multiple IoT devices 330 send signals to obtain the features of the multiple sensing pairs.

In step S530, the central control device 310 creates a sensing-pair list including the multiple sensing pairs and the features of each of the multiple sensing pairs.

In step S540, the central control device 310 obtains multiple first pairs whose features satisfy a first feature condition from the sensing-pair list.

In step S550, the central control device 310 dynamically schedules the multiple IoT devices of the multiple first pairs to send and receive signals in a time sharing fashion to obtain a first sensing signal of each of the multiple first pairs.

In step S560, if determining that the first sensing signal satisfies a first intrusion condition, the central control device 310 tags the first pair with a first status code, otherwise tags the first pair with a second status code.

In step S570, based on a paired node, the central control device 310 counts respectively the first status code and the second status code of the multiple first pairs that the paired node belongs, to determine whether any intrusion condition occurs at the space position close to the paired node.

For the sake of description, detailed statement of each step of the intrusion detection method is provided incorporated with the implementation scenario of FIG. 4.

The central control device 310 obtains the multiple sensing pairs from the paired combination of the IoT devices A, B, C, and D (step S510) and obtains the feature of each sensing pair (step S520). In one embodiment, the central control device 310 sets the IoT devices A, B, C, and D to take turns performing the AP mode of receiving the sensing signals to collect the sensing signals of all the sensing pairs. Furthermore, the IoT device 330 of the AP mode receives the sensing signal of one IoT device 330 that performs the STA mode at one time, so the IoT device 330 of the AP mode takes turns receiving the sensing signals (such as a time-division multiplexing) to avoid collisions.

The IoT device of the sniffer mode can receive the sensing signals of one or more IoT devices. Therefore, the more the IoT devices perform the AP mode and/or the sniffer mode, the more sensing signals of the sensing pairs are received at the same time, the sensing signals of all the sensing pairs can be collected more quickly.

A pair of two IoT devices is represented by a colon ':'. For example, the pair of the IoT device A and the IoT device B is represented as "pair A:B" which means that the IoT device A of the STA mode sends the sensing signals to the IoT device B of the AP mode, or the IoT device B sends the sensing signal to the IoT device A. In other words, in the same sensing pair, the feature of the sensing signal that the IoT device A sends to the IoT device B is regarded as the same as the feature of the sensing signal that the IoT device B sends to the IoT device A.

In one embodiment, the central control device 310 assigns the transmission power and the subcarrier of the IoT device that performs the STA mode.

In one embodiment, the feature of the sensing pair is the wireless communication signal sent by the communication module. For example, the Received Signal Strength Indication (RSSI), the Channel State Information (CSI), the response message of the Internet Control Message Protocol (ICMP) (request/reply message, such as a ping value), and so on.

Figure 6:
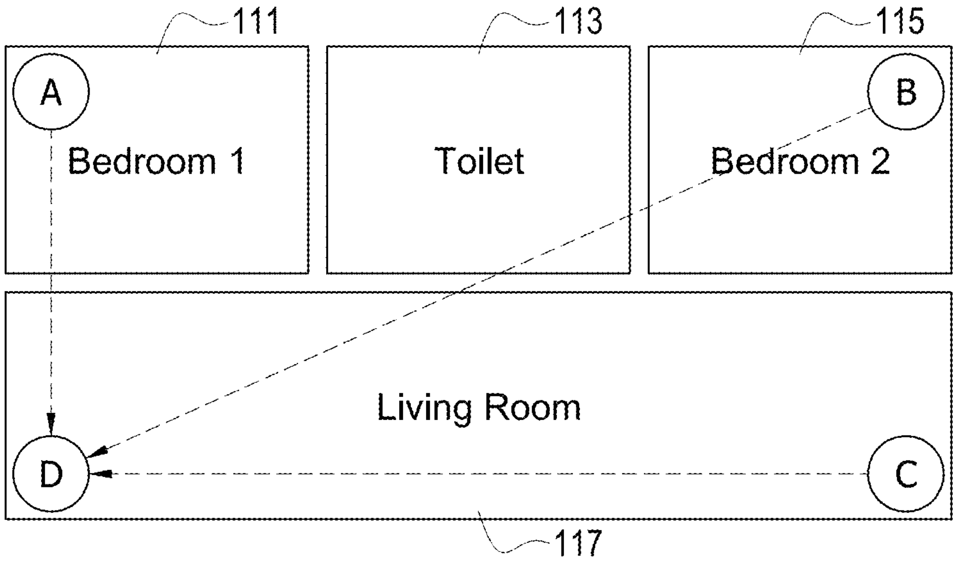
FIGS. 6 to 8 are schematic diagrams of receiving sensing signals of all sensing pairs in a time sharing fashion according to one embodiment of the present disclosure.
Figure 7:
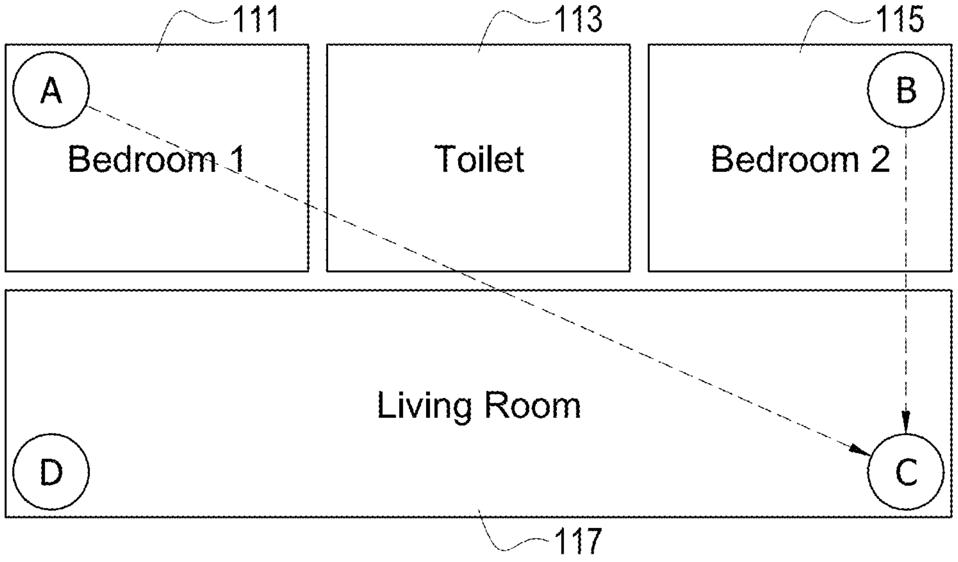
Figure 8:
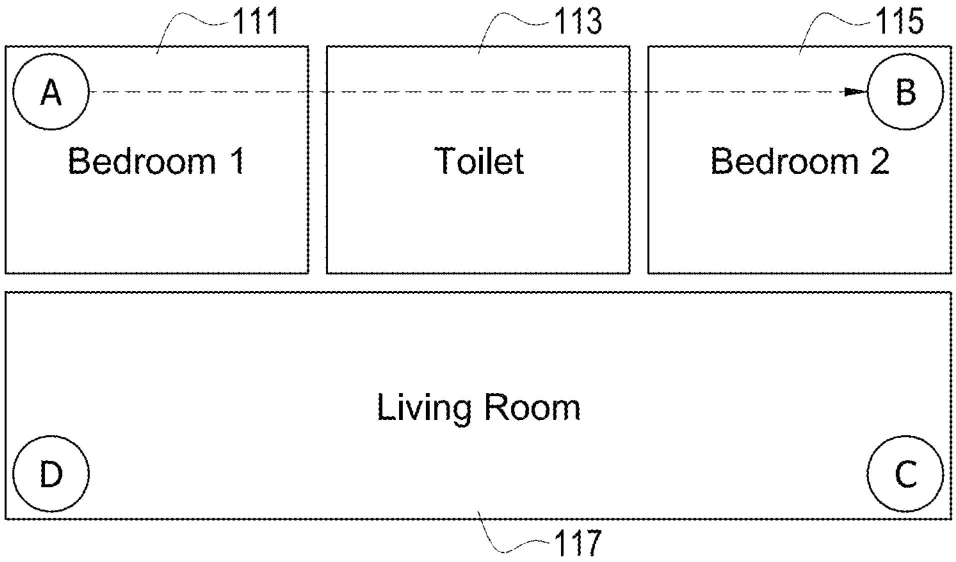

FIGS. 6 to 8 are schematic diagrams of receiving sensing signals of all sensing pairs in a time sharing fashion according to one embodiment of the present disclosure.

The central control device 310 pre-assigns an order to the IoT devices D, C, and B to make the IoT devices D, C, and B take turns performing the AP mode.

As shown in FIG. 6, in a first duration T1, the IoT device D performs the AP mode, so three sensing pairs A:D, B:D, and C:D are created according to the order of the IoT devices A, B, and C, and the IoT device D receives the sensing signal of each sensing pair. For example, in a first sub-duration T1.1, the IoT device A sends the sensing signal to the IoT device D; in a second sub-duration T1.2, the IoT device B sends the sensing signal to the IoT device D; in a third sub-duration T1.3, the IoT device C sends the sensing signal to the IoT device D. The first sub-duration T1.1, the second sub-duration T1.2, and the third sub-duration T1.3 are in the sequential order of sub-durations. Therefore, the central control device 310 receives the features of the sensing signals of the three sensing pairs of the first duration T1.

As shown in FIG. 7, in a second duration T2, the IoT device C performs the AP mode, so two sensing pairs A:C and B:C are created according to the order of the IoT devices A and B, and the IoT device C receives the sensing signal of each sensing pair. For example, in a first sub-duration T2.1, the IoT device A sends the sensing signal to the IoT device C; in a second sub-duration T2.2, the IoT device B sends the sensing signal to the IoT device C. The first sub-duration T2.1 and the second sub-duration T2.2 are in the sequential order of sub-durations. Therefore, the central control device 310 receives the features of the sensing signals of the two sensing pairs of the second duration T2.

As shown in FIG. 8, in a third duration T3, the IoT device B performs the AP mode, so one sensing pair A:B is created and the IoT device B receives the sensing signal of the sensing pair. For example, in a first sub-duration T3.1, the IoT device A sends the sensing signal to the IoT device B. Therefore, the central control device 310 receives the features of the sensing signals of one sensing pair of the third duration T3.

Based on the creation procedure of FIG. 6 to FIG. 8, the central control device 310 may receive six sensing pairs and the features of the sensing signals of each sensing pair (hereinafter referred to as "features of the sensing pair"). The central control device 310 creates the sensing-pair list including the multiple sensing pairs and the features of each sensing pair (step S530), as shown in Table 1. In Table 1, the features are the RSSI averages. For example, the RSSI average of the sensing pair A:D is −35.

TABLE 1 the sensing-pair list (the original list without ordering)

| Sensing Pairs | Features (RSSI averages) |
|---|---|
| A:D | −35 |
| B:D | −62 |
| C:D | −54 |
| A:C | −61 |
| B:C | −38 |
| A:B | −55 |

The central control device 310 obtains the multiple first pairs whose features satisfy the first feature condition from the sensing-pair list (step S540). The feature of the sensing pairs may be the RSSI, the CSI, the ping value, and so on. In one embodiment, the first feature condition is satisfied when a feature is greater than the RSSI or the CSI corresponding to a first distance, or greater than a default ping value. For example, the RSSI of the first feature condition is −60. The central control device 310 obtains the sensing pairs whose RSSI is greater than −60 (i.e., the first pair) from the six sensing pairs, as shown in Table 2 (the sensing pair which is not the first pair is labeled 'No').

TABLE 2 the sensing-pair list (the first pair)(threshold: the RSSI is −60)

| Sensing Pairs | Features (RSSI average) | First pair |
|---|---|---|
| A:D | −35 | Yes |
| B:D | −62 | No |
| C:D | −54 | Yes |
| A:C | −61 | No |
| B:C | −38 | Yes |
| A:B | −55 | Yes |

Figure 9:
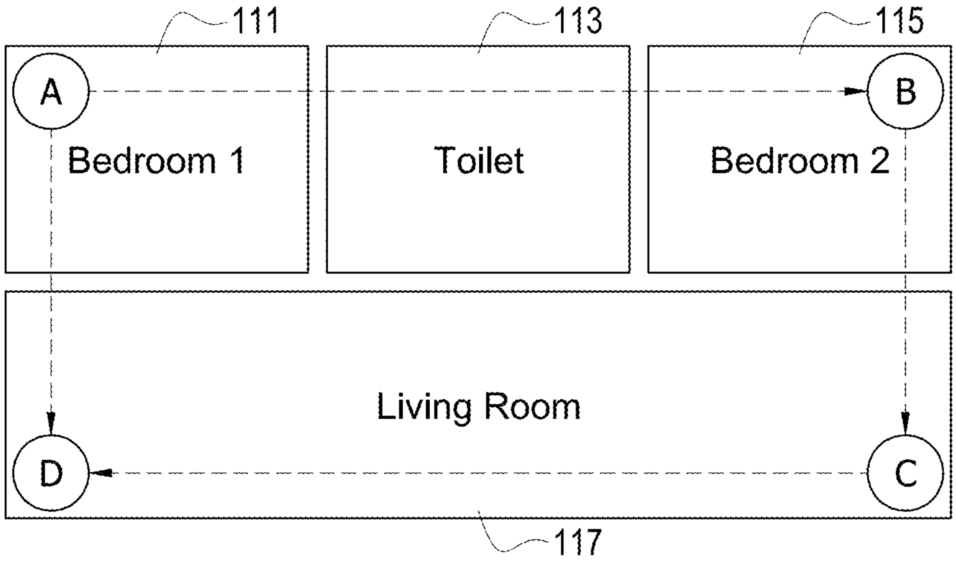
FIG. 9 is a schematic diagram of first pairs according to one embodiment of the present disclosure.

FIG. 9 is a schematic diagram of the first pairs according to one embodiment of the present disclosure.

In the implementation scenario, the central control device 310 obtains the first pairs: A:D, C:D, B:C, and A:B.

The central control device 310 dynamically schedules the multiple IoT devices of the multiple first pairs to send and receive signals to obtain the first sensing signal of each first pair (step S550).

In one embodiment, the central control device 130 collects the first N groups of the sensing pairs having common IoT devices in sequence, sets the common IoT devices as the sender, and sets another IoT device of each of the N sensing pairs as the receiver, so these sensing pairs perform sensing procedure one by one in a time sharing fashion (first sensing signals).

As shown in FIG. 9, the central control device 130 collects the first 3 groups of the sensing pairs having common IoT devices in sequence, where the sensing pairs A:D and C:D are the first group, the sensing pair B:C is the second group, and the sensing pair A:B is the third group. The common IoT device (i.e., the IoT device D) of the first group is set as the sender and the IoT devices A and C are set as the receiver; the common IoT device (i.e., the IoT device C) of the second group is set as the sender and the IoT device B is set as the receiver; the common IoT device (i.e., the IoT device B) of the first group is set as the sender and the IoT devices A is set as the receiver. The sensing pairs A:D, C:D, B:C, and A:B perform sensing procedures one by one in a time sharing fashion and continuously generate the first sensing signals (such as the RSSIs).

The central control device 310 continuously monitors the first sensing signals and determines whether the first sensing signals satisfy the first intrusion condition. The first intrusion condition may be that the quantity of the feature of the sensing pair that is greater than a threshold (e.g., the RSSI is −60) is greater than a tolerance (such as 5 times).

If determining that the first sensing signals satisfy the first intrusion condition, the central control device 310 tags the first pair with the first status code, otherwise tags the first pair with the second status code (step S560). The first status code may be the numeral value 1, and the second status code may be the numeral value 0. An edge of two nodes is regarded as the first pair. Tagging the first pair with the first status code or the second status code indicates tagging the edge of two nodes with the first status code or the second status code.

Figure 10:
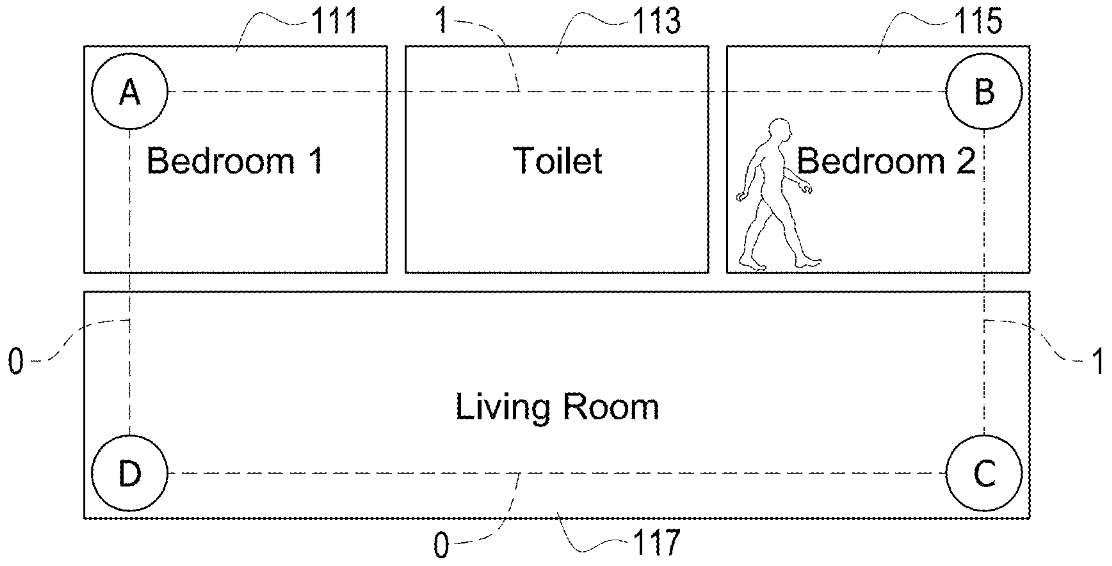
FIG. 10 is a schematic diagram of tagging the first pairs with a first status code or a second status code according to one embodiment of the present disclosure.

FIG. 10 is a schematic diagram of tagging the first pairs with a first status code or a second status code according to one embodiment of the present disclosure.

The tagging of the sensing pairs A:D, C:D, B:C, and A:B by the central control device 310 is shown in FIG. 10. After a period of sensing time, the sensing pairs A:B and B:C are tagged with 1 (first status code), and the sensing pairs A:D and C:D are tagged with 0 (second status code).

The central control device 310 respectively counts the first status code and the second status code of the multiple first pairs that each paired node belongs to determine the intrusion condition occurs at the space position close to a paired node (step S570). The central control device 310 counts the status codes of the first pairs to which a paired node belongs and determines the intrusion classification of the space position close to the paired node: no intrusion condition occurs, the intrusion condition occurs, or the suspected intrusion occurs.

In one embodiment, when one of the first pairs which one paired node belongs to is tagged with the second status code (first classification), the central control device 310 determines that no intrusion condition occurs at the space position close to the paired node. When all of the first pairs of the paired node are tagged with the first status code, and further, one of the multiple first pairs of the paired node includes another paired node of which one of multiple adjacent-node pairs is tagged with the second status code (second classification), the central control device 310 determines that the intrusion condition occurs at the space position close to the paired node. When a classification other than the first and second classification (third classification) is determined, the central control device 310 determines that the suspected intrusion condition occurs at the space position close to the paired node.

For example, the paired node A (i.e., the IoT device A) has two sensing pairs A:B and A:D. As shown in FIG. 10, the sensing pair A:B is tagged with the first status code, and the sensing pair A:D is tagged with the second status code. Therefore, the central control device 310 sums up the first pairs to which the paired node A belongs has two status codes (1 and 0) (first classification) and determines that no intrusion condition occurs at the space position close to the IoT device A. Similarly, no intrusion condition occurs at the space positions close to the IoT devices C and D.

For another example, the paired node B (i.e., the IoT device B) has two sensing pairs A:B and B:C. As shown in FIG. 10, both the sensing pairs A:B and B:C are tagged with the first status code, and the sensing pair A:D (adjacent-node pair) to which another paired node A of one sensing pair A:B (i.e., in the sensing pair A:B, when the IoT device B is the paired node, the IoT device A is the another paired node)

belongs is tagged with second status code (second classification). Therefore, the central control device 310 determines that the intrusion condition occurs at the space position close to the IoT device B. If considering that the IoT device C is the paired node, the IoT device C has two sensing pairs C: B and C:D. As shown in FIG. 10, the sensing pair C: B is tagged with the first status code, and the sensing pair C:D is tagged with the second status code. Because existing sensing pair C:D is tagged with the second status code among the sensing pairs to which the paired node C belongs (the first classification), the central control device 310 determines that no intrusion condition occurs at the space position close to the IoT device B.

In one embodiment, before obtaining the multiple first pairs whose features satisfy the first feature condition from the sensing-pair list (step S540) (i.e., the central control device 310 obtains Table 1 from the pair combinations of the multiple sensing pairs in FIGS. 6 to 8), the central control device 310 orders the features of the sensing pairs of the sensing-pair list (Table 1) from least to greatest and obtains multiple second pairs according to the features that satisfy the second feature condition, as shown in Table 3. The second feature condition may be smaller than the threshold (e.g., RSSI is −60) corresponding to the long distance (such as 10 meters) or smaller than the default ping value.

TABLE 3 the sensing-pair list (the second pairs) (threshold: RSSI is −60)

| Sensing Pairs | Features (RSSI averages) | Second Pair |
|---|---|---|
| B:D | −62 | Yes |
| A:C | −61 | Yes |
| A:B | −55 | No |
| C:D | −54 | No |
| B:C | −38 | No |
| A:D | −35 | No |

Figure 11:
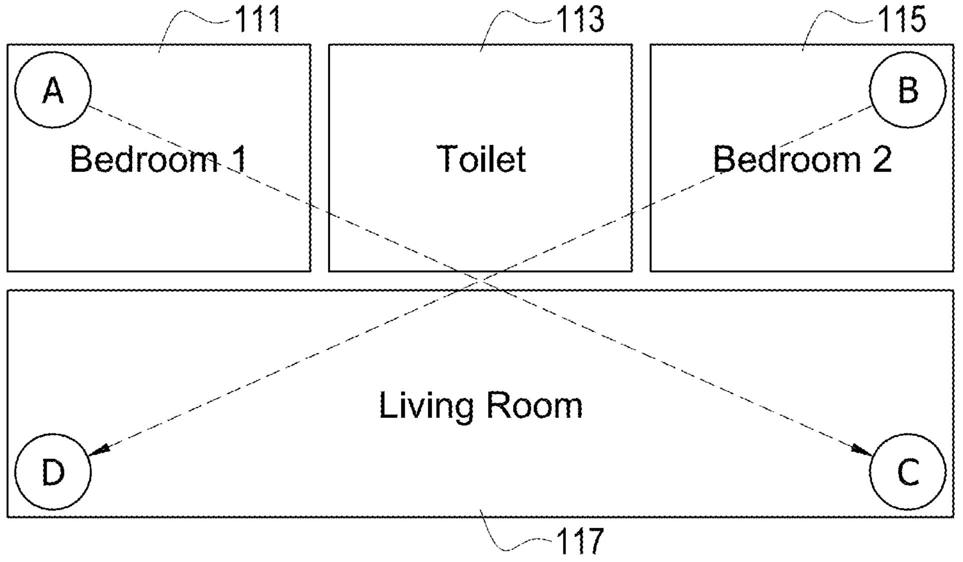
FIG. 11 is a schematic diagram of second pairs according to one embodiment of the present disclosure.

FIG. 11 is a schematic diagram of second pairs according to one embodiment of the present disclosure.

In one embodiment, in the situation of no obstacles and the fixed transmission power at the transmitter, a relationship exists between the magnitude of the sensing signal and the distance to the receiver, for example, the longer the distance, the smaller the sensing signal.

To retain the sensing pairs with longer distances among the IoT devices, the central control device 310 keeps the sensing pairs that satisfy the second feature condition (e.g., RSSI is smaller than −60) as the second pairs (such as the sensing pairs B:D and A:C). In other words, the central control device 310 detects the pairs with longer distances among the IoT devices A, B, C, and D in the 6 sensing pairs as the sensing pair, that is, the sensing pair A:C and B:D to perform monitoring.

The central control device 310 schedules the multiple IoT devices 330 of the multiple second pairs to send signals to obtain the second sensing signals of each of the multiple second pairs. For example, the central control device 310 continuously receives the second sensing signals of the sensing pairs B:D and A:C in a time sharing fashion.

In one embodiment, the central control device 310 continuously detects whether the second sensing signal satisfies the first abnormal condition. When determining that the second sensing signal does not satisfy the first abnormal condition, the central control device 310 continuously receives and detects the second sensing signal. The first abnormal condition may be that the quantity that the sensing signals is greater than the threshold (e.g., RSSI is greater than −60) is greater than a tolerance (such as 5 times).

Figure 12:
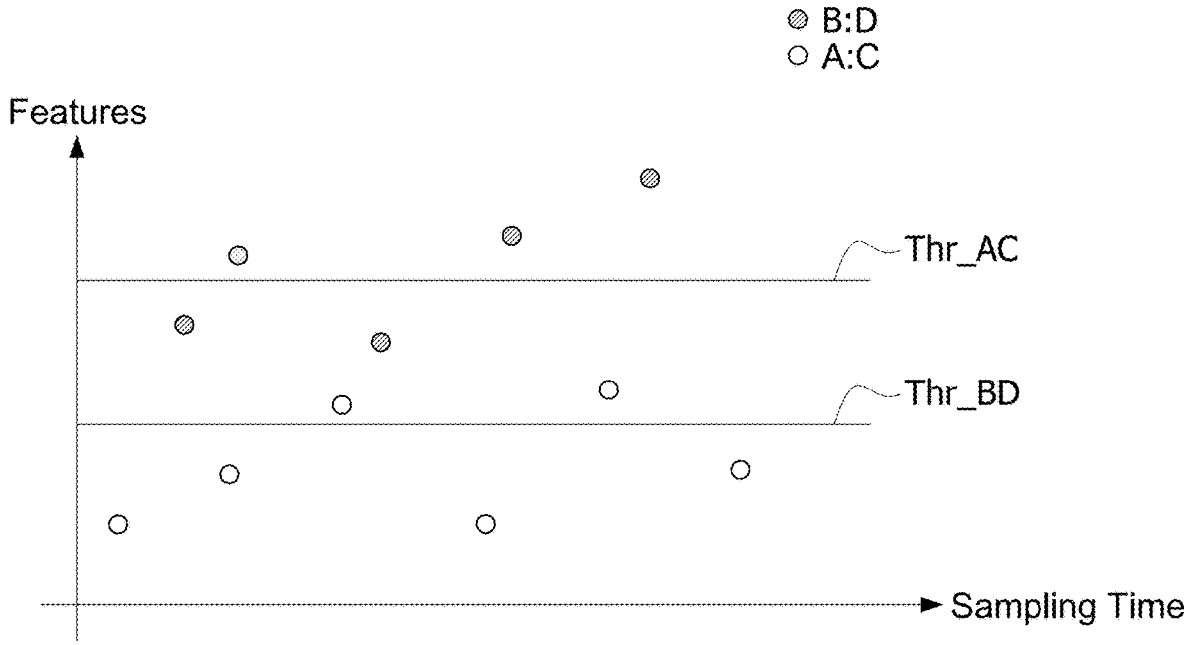
FIG. 12 is a schematic diagram of features and sampling time of the second sensing signals according to one embodiment of the present disclosure.

FIG. 12 is a schematic diagram of features and sampling time of the second sensing signals according to one embodiment of the present disclosure.

As shown in FIG. 12, the five second sensing signals of the sensing pair B:D are all greater than the threshold Thr_BD, satisfying the threshold for at least 5 times, then the central control device 310 determines that the second sensing signal of the sensing pair B:D satisfies the first abnormal condition.

In one embodiment, when determining that the second sensing signals satisfy the first abnormal condition, the central control device 310 orders the features of the sensing pairs of the sensing-pair list from greatest to least (i.e., the central control device 310 obtains Table 1 from the paired combinations of the multiple sensing pairs in FIG. 6 to FIG. 8) and obtains multiple third pairs according to the features satisfying a third feature condition, as shown in Table 4. The third feature condition is satisfied when a feature is greater than the threshold (e.g., RSSI is greater than −40) corresponding to the short distance (such as 4 meters).

TABLE 4 the sensing-pair list (the third pair) (threshold: RSSI is −40)

| Sensing Pairs | Features (RSSI averages) | Third Pair |
|---|---|---|
| A:D | −35 | Yes |
| B:C | −38 | Yes |
| C:D | −54 | No |
| A:B | −55 | No |
| A:C | −61 | No |
| B:D | −62 | No |

Figure 13:
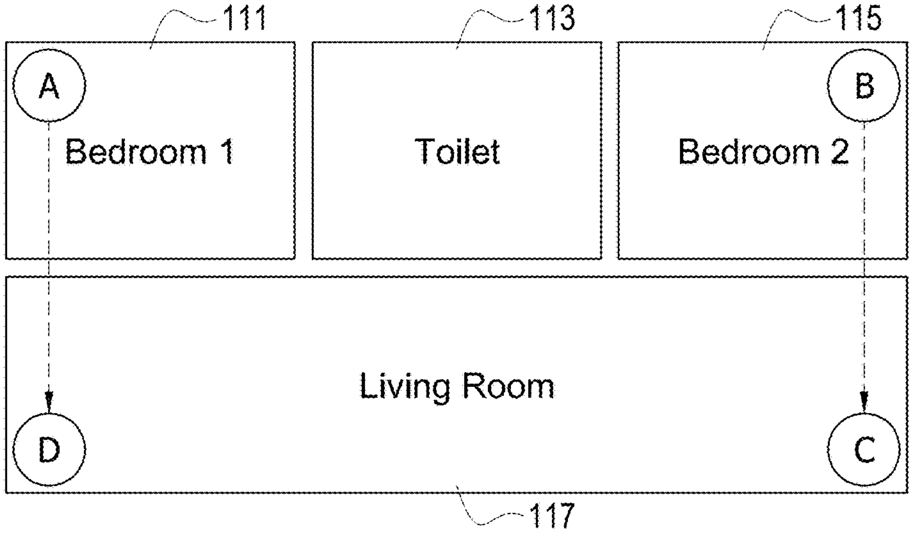
FIG. 13 is a schematic diagram of third pairs according to one embodiment of the present disclosure.

FIG. 13 is a schematic diagram of third pairs according to one embodiment of the present disclosure.

To retain the sensing pairs with the shorter distance among the IoT devices, the central control device 310 keeps the sensing pairs that satisfy the third feature condition (e.g., RSSI is greater than −40) as the third pair (such as the sensing pairs A:D and B:C). In other words, after detecting the sensing pairs with the longer distances and determining that the suspected intrusion condition may occur, the central control device 310 retains the sensing pairs with the shorter distance among the IoT devices A, B, C, and D from the six sensing pairs as the sensing pairs to be detected, i.e., the sensing pairs A:C and B:D, to monitor the environment.

The central control device 310 schedules the multiple IoT devices 330 of the multiple third pairs to send signals to obtain a third sensing signal of each third pair. For example, the central control device 310 continuously receives the third sensing signals of the sensing pairs A:C and B:D in—a time sharing fashion.

In one embodiment, the central control device 310 continuously detects whether the third sensing signals satisfy a second abnormal condition. When determining that the third sensing signal does not satisfy the second abnormal condition, the central control device 310 continuously receives and detects the third sensing signal. The second abnormal condition may be that the quantity of the feature of the sensing pair that is greater than the threshold (e.g., RSSI is −40) is greater than a tolerance (such as 5 times).

It should be noted that the central control device 310 may set one or more thresholds with human presence or one or more thresholds without human presence (to the first abnormal condition and the second abnormal condition).

In another embodiment, the first abnormal condition and/or the second abnormal condition may be the condition that the second sensing signals of H sensing pairs are greater than the threshold for continuous L times, where H and L are positive integers.

In another embodiment, H sensing pairs may be divided into G groups. The first abnormal condition and/or the second abnormal condition may be the condition that the second sensing signals in S groups of G groups are greater than the threshold for continuous L times, where G and S are positive integers and S is smaller than or equal to G.

Figure 14:
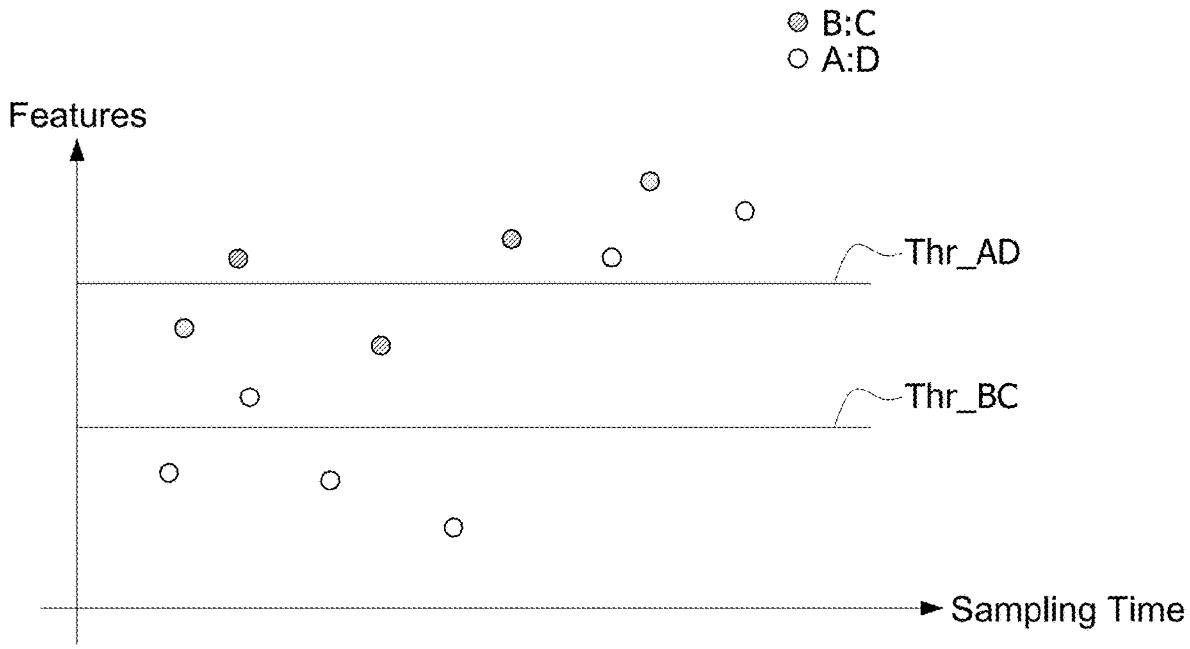
FIG. 14 is a schematic diagram of features and sampling time of the third sensing signals according to one embodiment of the present disclosure.

FIG. 14 is a schematic diagram of features and sampling time of the third sensing signals according to one embodiment of the present disclosure.

As shown in FIG. 14, the five third sensing signals of the sensing pair B:C are all greater than the threshold Thr_BC, satisfying the threshold of at least 5 times, then the central control device 310 determines that the third sensing signals of the sensing pair B:C satisfy the second abnormal condition.

In one embodiment, when determining that the third sensing signals satisfy the second abnormal condition, the central control device 310 obtains the multiple first pairs whose features satisfy the first feature condition from the sensing-pair list (such as Table 1) (step S540), to dynamically schedule the multiple IoT devices of the multiple first pairs to send signals in a time sharing fashion (step S550).

In one embodiment, in step of obtaining the multiple first pairs whose features satisfy the first feature condition from the sensing-pair list (step S540), the central control device 310 counts the sensing-pair quantity of each IoT device 330 from the multiple sensing pairs, orders the multiple sensing pairs based on the sensing-pair quantity from greatest to least, and updates the sensing-pair list by the multiple sensing pairs and the feature of each of the multiple sensing pairs ordered. The central control device 310 obtains the multiple first pairs whose features satisfy the first feature condition from the sensing-pair list updated.

The central control device 310 orders the content of Table 1 from greatest to least to obtain the content of Table 5.

TABLE 5 the sensing-pair list (ordering from greatest to least)

| Sensing Pairs | Features (RSSI averages) |
|---|---|
| A:D | −35 |
| B:C | −38 |
| C:D | −54 |
| A:B | −55 |
| A:C | −61 |
| B:D | −62 |

The central control device 310 filters the sensing pair whose feature is smaller than the threshold (RSSI is −60) and counts each sensing-pair quantity, shown in Table 6.

TABLE 6 the sensing-pair quantity

| IoT devices | Sensing-pair Quantity |
|---|---|
| A | 2 |
| B | 2 |
| C | 2 |
| D | 2 |

Then, the central control device 310 finds all the sensing pairs having the greatest sensing-pair quantity. In the embodiment, the central control device 310 finds all the sensing pairs of the IoT device A, i.e., the sensing pairs A:B and A:D, and updates the sensing-pair list as Table 7.

TABLE 7 the sensing-pair list (ordering the sensing pairs)

| Ordered Sensing Pairs | Unordered Sensing Pairs |
|---|---|
| A:B | B:C |
| A:D | C:D |

The central control device 310 updates the sensing-pair quantity according to the unordered sensing pairs of Table 7, shown as Table 8.

TABLE 8 the sensing-pair quantity

| IoT Devices | Sensing-pair Quantity |
|---|---|
| A | 0 |
| B | 1 |
| C | 2 |
| D | 1 |

The central control device 310 finds all the sensing pairs of the IoT device C having the greatest sensing-pair quantity, i.e., the sensing pairs B:C and C:D, and updates the sensing-pair list, shown as Table 9.

TABLE 9 the sensing-pair list (ordering the sensing pairs)

| Ordered Sensing Pairs | Unordered Sensing Pairs |
|---|---|
| A:B | |
| A:D | |
| B:C | |
| C:D | |

Then, the central control device 310 schedules the ordered sensing pairs to perform dynamic sensing in a time sharing fashion, shown in Table 10.

TABLE 10 the dynamic sensing of the ordered sensing pairs in a time sharing fashion (a set of the ordered sensing pairs)

| Ordered Sensing Pairs of Dynamic Sensing | AP | Sensing Duration |
|---|---|---|
| A:B | A | T1.1 |
| A:D | A | T1.2 |
| B:C | B | T2 |
| C:D | C | T3 |

It should be noted that the dynamic sensing pairs of Table 10 are with the detailed time-sharing embodiment of Table 2 (first pair: Yes).

The central control device 310 sets the sensing time of the IoT devices A, B, C, and D according to the dynamic sensing schedule in a time sharing fashion. For example, the order of execution time of the IoT devices A, B, C, and D by the dynamic sensing schedule in a time sharing fashion is the sensing pairs A:B, A:D, B:C, and C:D.

In one embodiment, before obtaining the multiple sensing pairs of the paired combination of the multiple IoT devices 330 (step S510), the central control device 310 detects a device identifier of the multiple IoT devices 330. Then, the central control device 310 sets a sensing schedule (such as the content of FIG. 6 to FIG. 8) of the multiple IoT devices 330 based on the device identifier and obtains the multiple sensing pairs (such as Table 1) of the multiple IoT devices when the multiple IoT devices 330 send and receive signals by taking turns playing the device roles according to the sensing schedule. The device role may be the STA mode, the AP mode, and the sniffer mode.

Figure 15:
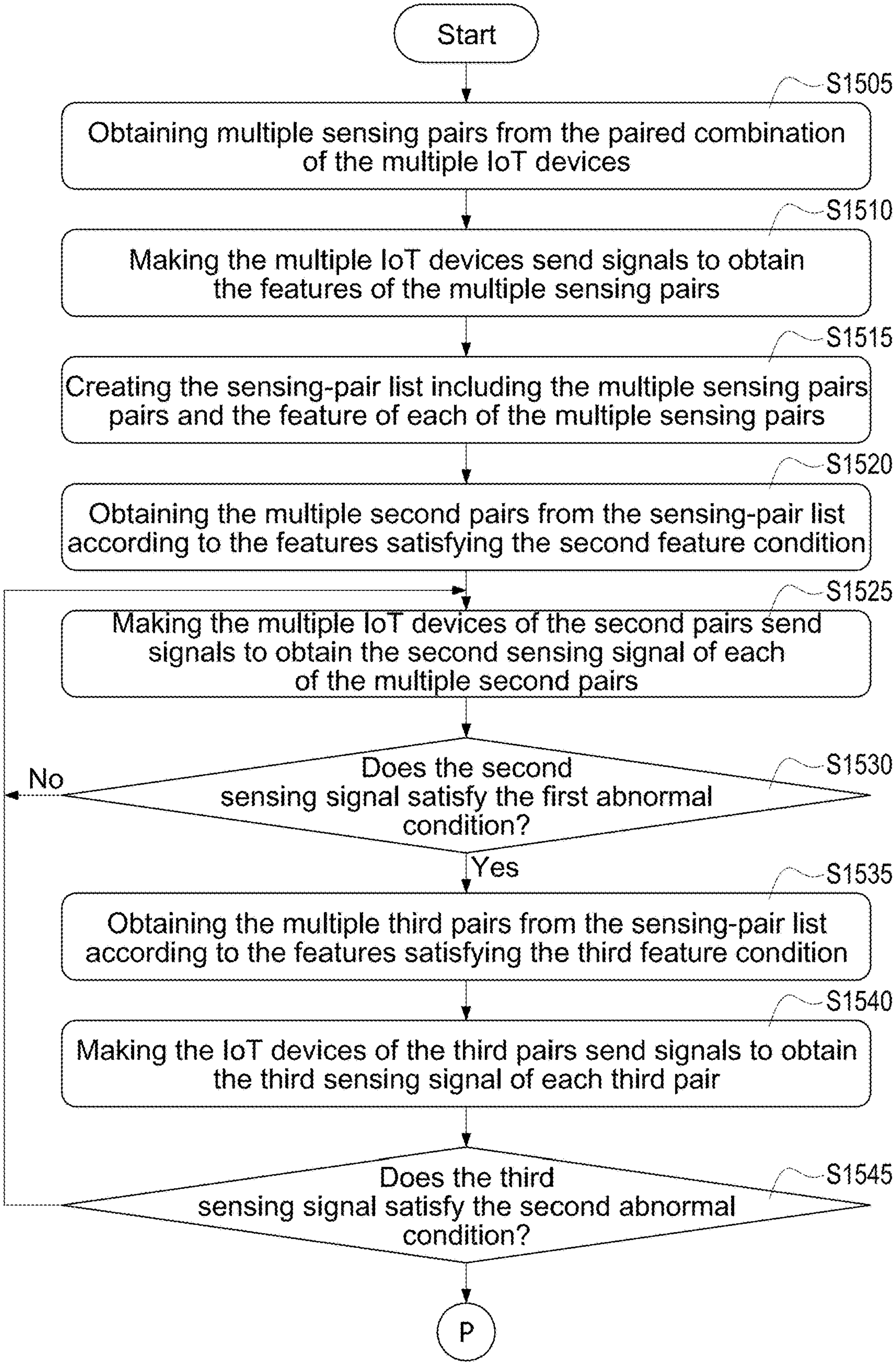
FIGS. 15, 16A, and 16B are flowcharts illustrating the intrusion detection method according to another embodiment of the present disclosure.
Figure 16A:
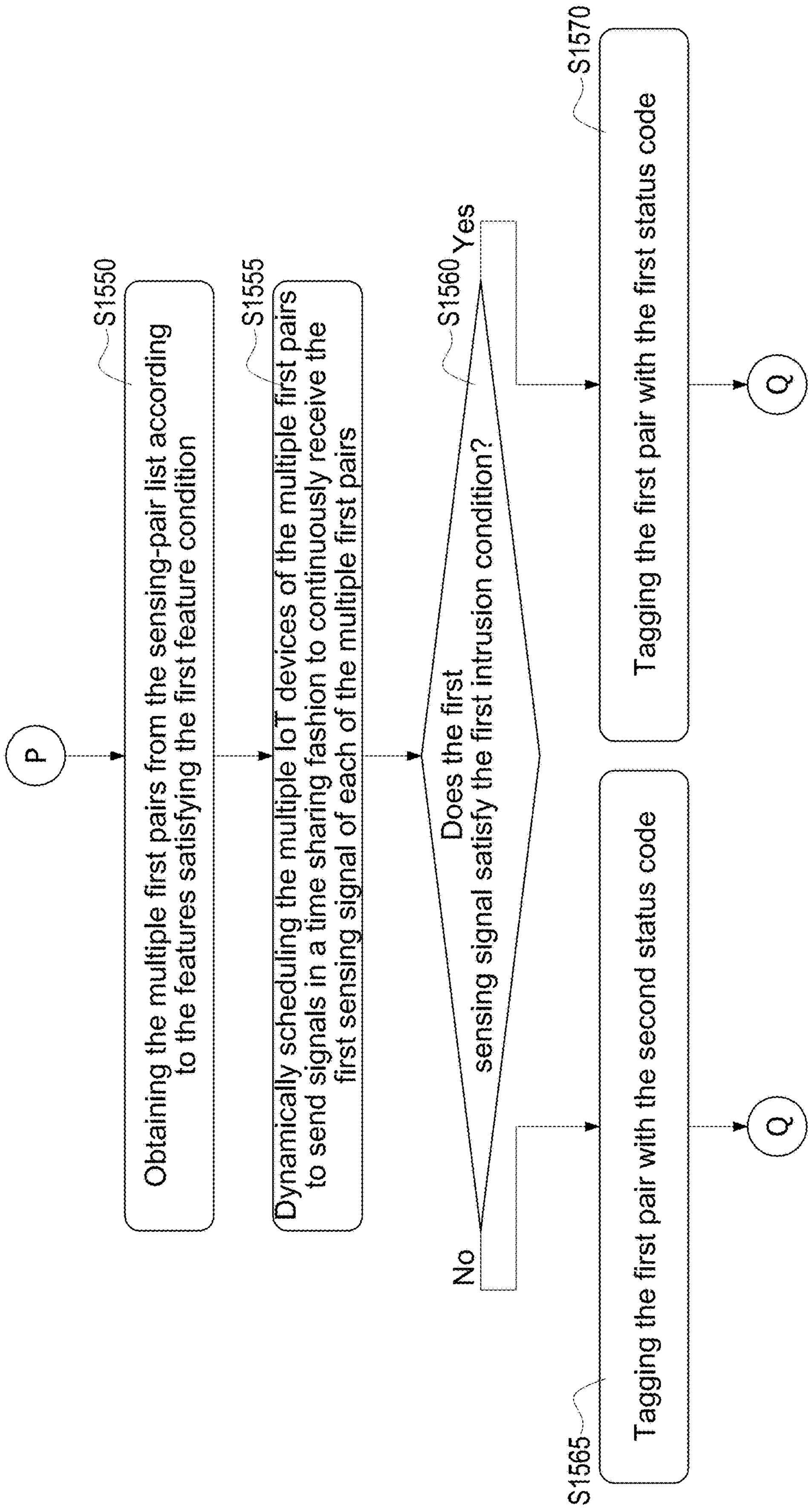
Figure 16B:
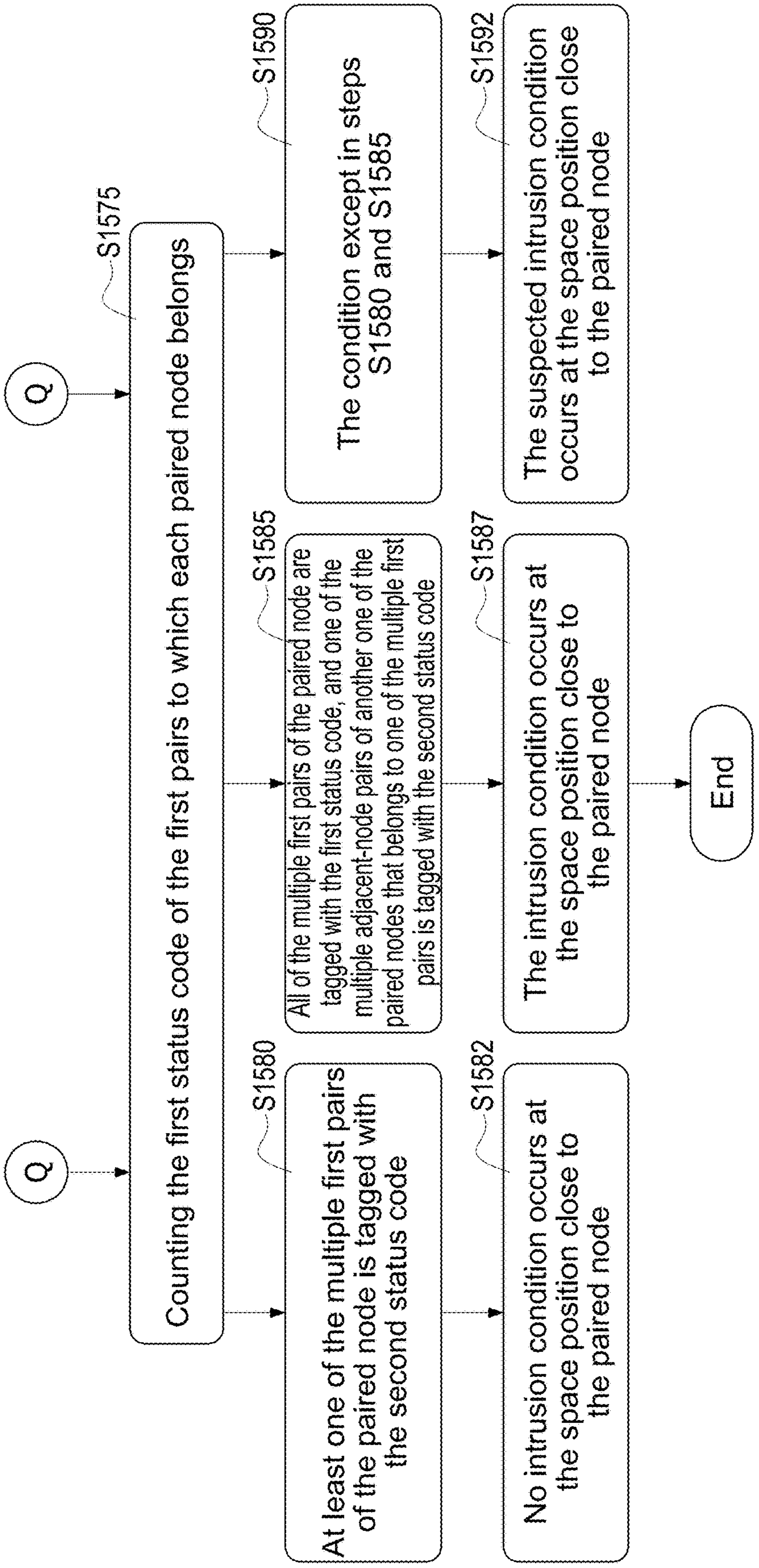

FIGS. 15, 16A, and 16B are flowcharts illustrating the intrusion detection method according to another embodiment of the present disclosure.

In step S1505, the central control device 310 obtains the multiple sensing pairs from the paired combination of the multiple IoT devices 330.

In step S1510, the central control device 310 makes the multiple IoT devices 330 send signals to obtain the features of the multiple sensing pairs.

In step S1515, the central control device 310 creates the sensing-pair list including the multiple sensing pairs and the features of each of the multiple sensing pairs.

In step S1520, the central control device 310 obtains the multiple second pairs from the sensing-pair list according to the features satisfying the second feature condition.

In step S1525, the central control device 310 makes the multiple IoT devices 330 of the second pairs send signals to obtain the second sensing signals of each of the multiple second pairs.

In step S1530, the central control device 310 determines whether the second sensing signal satisfies the first abnormal condition. If the second sensing signal satisfies the first abnormal condition, step S1535 is performed; otherwise, the process goes to step S1525.

In step S1535, the central control device 310 obtains the multiple third pairs from the sensing-pair list according to the features satisfying the third feature condition.

In step S1540, the central control device 310 makes the multiple IoT devices 330 of the third pair send signals to obtain the third sensing signals of each of the multiple third pairs.

In step S1545, the central control device 310 detects continuously whether the third sensing signal satisfies the second abnormal condition. If the third sensing signal satisfies the second abnormal condition, step S1550 is performed; Otherwise, the process goes to step S1525.

In step S1550, the central control device 310 obtains the multiple first pairs from the sensing-pair list according to the features satisfying the first feature condition.

In step S1555, the central control device 310 dynamically schedules the multiple IoT devices 330 of the multiple first pairs to send signals in a time sharing fashion to continuously receive the first sensing signal of each of the multiple first pairs.

In step S1560, the central control device 310 determines whether the first sensing signal satisfies the first intrusion condition. If the first sensing signal satisfies the first intrusion condition, step S1570 is performed; Otherwise, the process goes to step S1565.

In step S1565, the central control device 310 tags the first pair with the second status code.

In step S1570, the central control device 310 tags the first pair with the first status code.

In step S1575, the central control device 310 counts the first status code of the first pairs to which each paired node belongs.

In one embodiment, the central control device 310 determines the intrusion classification by the three conditions (steps S1580, S1585, and S1590) below according to the count of the status codes of the multiple first pairs.

In step S1580, the central control device 310 determines that at least one of the multiple first pairs of the paired node is tagged with the second status code. Then, in step S1582, the central control device 310 determines that no intrusion condition occurs at the space position close to the paired node.

In step S1585, the central control device 310 determines that all of the multiple first pairs of the paired node are tagged with the first status code, and one of the multiple adjacent-node pairs of another one of the paired nodes that belongs to one of the multiple first pairs is tagged with the second status code. Then, in step S1587, the central control device 310 determines that the intrusion condition occurs at the space position close to the paired node.

In step S1590, the central control device 310 determines the condition except in steps S1580 and S1585. Then, in step S1592, the central control device 310 determines that the suspected intrusion condition occurs at the space position close to the paired node.

Figure 17:
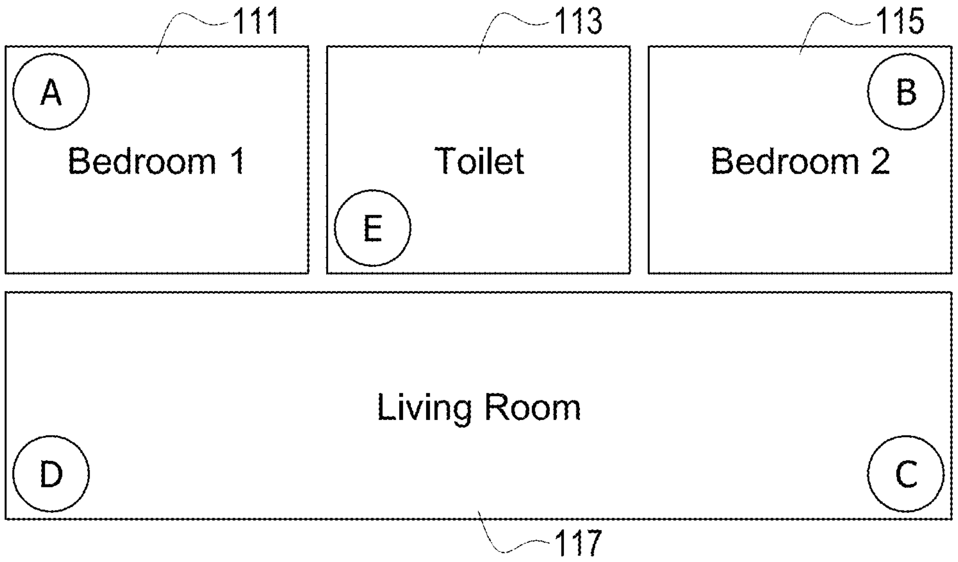
FIG. 17 is a schematic diagram of an implementation scenario where an IoT device is disposed according to another embodiment of the present disclosure.

FIG. 17 is a schematic diagram of an implementation scenario where an IoT device is disposed according to another embodiment of the present disclosure.

Compared with the implementation scenario of FIG. 4 that four IoT devices are disposed, the implementation scenario of FIG. 17 where five IoT devices are disposed (i.e., the additional IoT device E is disposed at a corner of the toilet 113) is provided.

Figure 18:
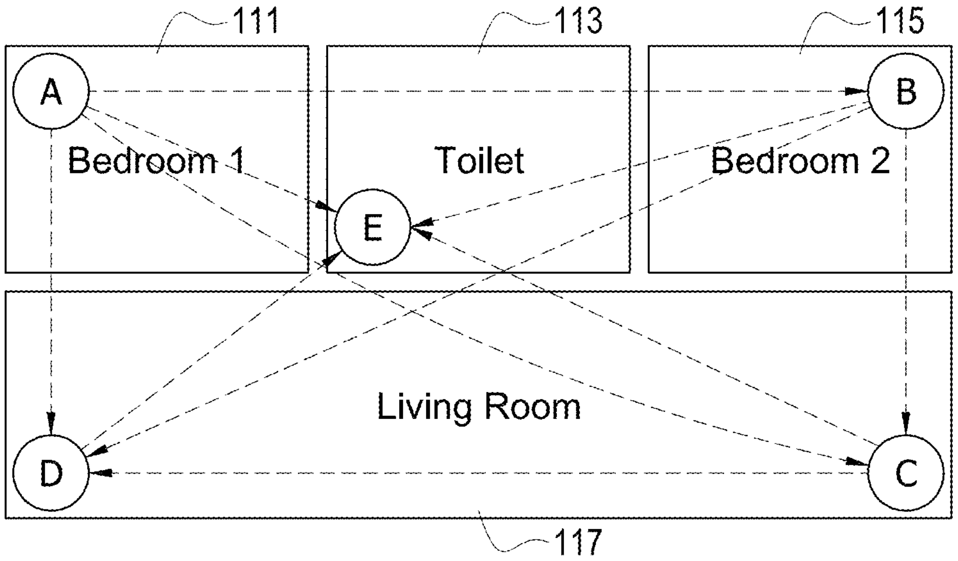
FIG. 18 is a schematic diagram of the multiple sensing pairs obtained from the implementation scenario of FIG. 17.

FIG. 18 is a schematic diagram of the multiple sensing pairs obtained from the implementation scenario of FIG. 17.

Similar to the description of FIG. 6 to FIG. 8, the central control device 310 sets the sensing schedule of the IoT devices A to E and makes the IoT devices A to E take turns playing the device role. In one embodiment, the order of the AP mode is the IoT devices E, D, C, and B. For example, in the first duration T1, the IoT device E of the AP mode receives the sensing signals of the IoT devices A, B, C, and D in a time sharing fashion. In the second duration T2, the IoT device D of the AP mode receives the sensing signals of the IoT devices A, B, and C in a time sharing fashion. In the third duration T3, the IoT device C of the AP mode receives the sensing signals of the IoT devices A and B in a time sharing fashion. In the fourth duration T4, the IoT device B of the AP mode receives the sensing signals of the IoT device A (step S1505 to step S1510).

The central control device 310 receives the features of the sensing signals of 10 sensing pairs and creates the sensing-pair list (step S1515), shown in Table 11.

TABLE 11 the sensing-pair list

| Sensing Pairs | Features (RSSI averages) |
|---|---|
| A:D | −35 |
| B:D | −62 |
| C:D | −54 |
| A:E | −35 |
| A:C | −61 |
| D:E | −32 |
| B:C | −38 |
| A:B | −55 |
| B:E | −55 |
| C:E | −54 |

The central control device 310 receives the channel information between two IoT devices through the Wi-Fi wireless sensing system as the features of the sensing signals of the sensing pairs. In one embodiment, in one pair of IoT devices 330 (two IoT devices one is a sender and another one is a receiver), when the transmission power is assigned (fixed) at the sender IoT device, the receiver IoT device receives the RSSI. In this embodiment, the feature of the sensing signal of the two IoT devices is the RSSI average.

In one embodiment, the central control device 310 computes function (1) to obtain the feature D:

$$D=\sum_{i=1}^{n} w_i \cdot d_i \qquad \text{function (1)}$$

In function (1), D is the feature, $d_i$ is the ith RSSI feature value, $w_i$ is the weight of the ith RSSI feature value.

RSSI feature value may be but is not limited to the value 1 or 0: when the ratio K % of the RSSI measuring values received by the receiver IoT device is greater than a threshold, the RSSI feature value is 1, otherwise, the RSSI feature value is 0, where K is a positive integer.

In another embodiment, when the transmission power and the subcarrier of the sender IoT device are assigned (fixed), the receiver IoT device receives the CSI information. In the embodiment, the feature may be the CSI average.

In another embodiment, the central control device 310 may compute function (2) to obtain the feature D:

$$D=\sum_{i=1}^{n} w_i \cdot d_i \qquad \text{function (2)}$$

In function (2), D is the feature, $d_i$ is the ith CSI feature value, and $w_i$ is the weight of the ith CSI feature value.

The CSI feature value may be but is not limited to the maximal value, the minimum value, the standard deviation, or the average of the CSI amplitude of the several subcarriers, the CSI amplitude average adding to the standard deviation of N1 CSI amplitudes or the standard deviation of N2 CSI amplitudes subtracting from the CSI amplitude average, the average of the difference among the continuous several CSI amplitudes, the packet quantity (including the CSI information) received in a unit time, the average of CSI phase differences of some specific subcarriers or continuous subcarriers, where N1 and N2 are positive integers.

In one embodiment, in one pair of IoT devices 330 (two IoT devices one is a sender and another one is a receiver), the sender IoT device sends M measuring packets and the receiver IoT device receives m data packets, where M and m are positive integers. In the embodiment, the central control device 310 computes function (3) to obtain the feature D:

$$D=mj/Mj \qquad \text{function (3)}$$

In function (3), D is the feature, mj is the packet quantity received by the jth sensing pair of the receiver, Mj is the measuring packet quantity sent by the jth sensing pair of the sender.

The central control device 310 orders the features of each of the sensing pairs in the sensing-pair list (Table 11) from least to greatest to obtain a first ordered sensing-pair list and obtains the multiple second pairs according to the features satisfying the second feature condition (step S1520), as shown in Table 12. The second feature condition may be smaller than the threshold (e.g., RSSI is −56) corresponding to the long distance (such as 10 meters).

TABLE 12 the first ordered sensing-pair list (the second pair) (threshold: RSSI is −56)

| Sensing Pairs | Features (RSSI averages) | Second Pairs |
|---|---|---|
| B:D | −62 | Yes |
| A:C | −61 | Yes |
| A:B | −58 | Yes |
| C:D | −57 | Yes |
| B:E | −55 | No |
| C:E | −54 | No |
| B:C | −38 | No |
| A:D | −35 | No |
| A:E | −35 | No |
| D:E | −32 | No |

Figure 19:
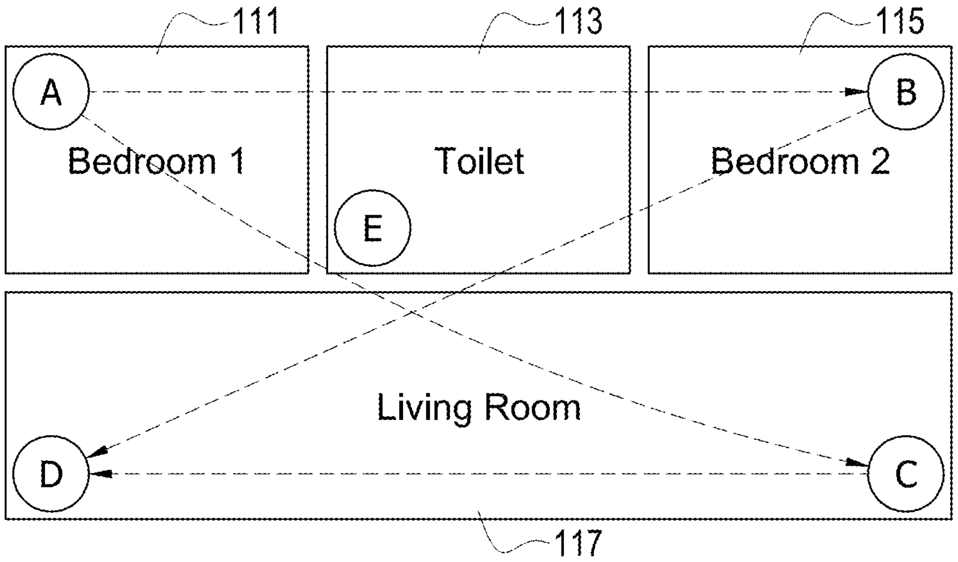
FIG. 19 is a schematic diagram of the second pairs according to one embodiment of the present disclosure.

FIG. 19 is a schematic diagram of the second pairs according to one embodiment of the present disclosure.

In the embodiment, the central control device 310 detects the pairs with farther distance among the IoT devices A, B, C, and D in the 10 sensing pairs as the sensing pairs, that is, the sensing pairs A:B, A:C, B:D, and C:D to perform monitoring (step S2520).

The central control device 310 sets the sensing schedule of the IoT devices A, B, C, and D, makes the IoT devices A, B, C, and D take turns playing the device role to perform paired sensing process and receives the sensing signals of the four sensing pairs. For example, in the first duration, the central control device 310 sets the IoT devices A and B as the STA mode and sets the IoT devices C and D as the AP mode, where the IoT device A connects to the IoT device C (on channel 36) and the IoT device B connects to the IoT device D (on channel 44). In the second duration, the central control device 310 sets IoT devices A and C as the STA mode and sets the IoT devices B and D as the AP mode, where IoT device A connects to the IoT device B (on channel 40) and the IoT device C connects to the IoT device D (on channel 48). After configurations, the central control device 310 receives the second sensing signals of the sensing pairs A:C, B:D, A:B, and C:D every 0.5 seconds (step S1525).

The central control device 310 continuously determines whether the second sensing signal satisfies the first abnormal condition. For example, the first abnormal condition is that the second sensing signal of any one of the second sensing pairs is continuously greater than the threshold 5 times. If the central control device 310 determines that the second sensing signal is continuously greater than the threshold 5 times in two seconds, the potential intrusion may happen.

In steps 1520 to S1530, the central control device 310 uses the sensing pair corresponding to the long distance to determine whether the potential intrusion happens, to make a preliminary determination of the intrusion detection of a large space by using the long distance (determination if any human is present).

If the central control device 310 determines that the potential intrusion may not happen (step S1530), the process goes to the step of continuously receiving and detecting the second sensing signal (step S1525), to perform continuous monitoring.

If determining that the potential intrusion may happen (step S1530), the central control device 310 obtains the multiple third pairs from the sensing-pair list (Table 11) according to the features satisfying the third feature condition.

In one embodiment, the central control device 310 orders the features of the sensing pairs of the sensing-pair list (Table 11) from greatest to least to obtain a second ordered sensing-pair list, and sets the sensing pairs whose features satisfy the third feature condition as the third pair, as shown in Table 13. The third feature condition is satisfied when a feature is greater than the threshold (e.g., RSSI is −40) corresponding to the short distance (such as 4 meters).

TABLE 13 the second ordered sensing-pair list (the third pair) (threshold: RSSI is −40)

| Sensing Pairs | Features (RSSI averages) | Third Pair |
|---|---|---|
| D:E | −32 | Yes |
| A:E | −35 | Yes |
| A:D | −35 | Yes |
| B:C | −38 | Yes |
| C:E | −54 | No |
| B:E | −55 | No |
| C:D | −57 | No |
| A:B | −58 | No |
| A:C | −61 | No |
| B:D | −62 | No |

Figure 20:
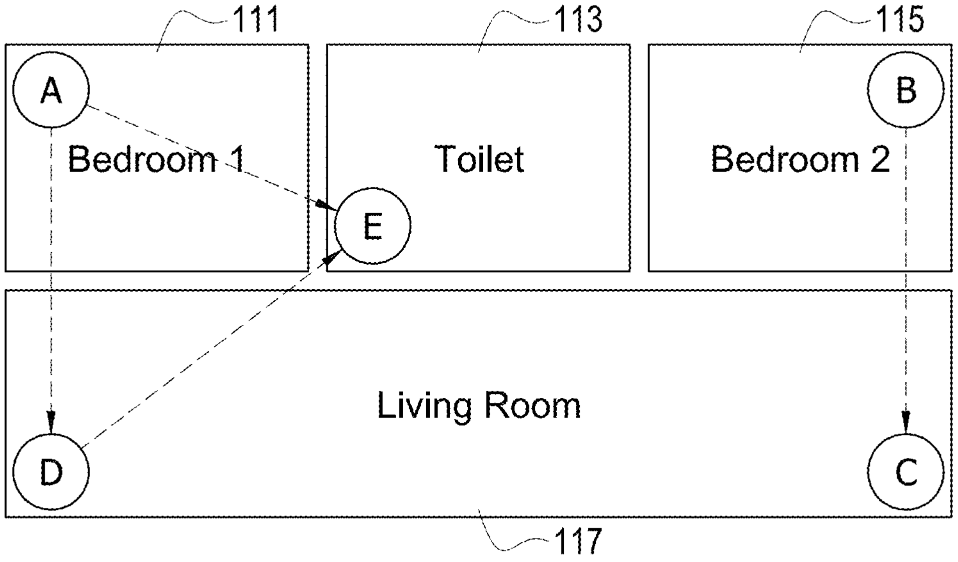
FIG. 20 is a schematic diagram of the third pairs according to one embodiment of the present disclosure.

FIG. 20 is a schematic diagram of the third pairs according to one embodiment of the present disclosure.

Incorporated with Table 13, FIG. 20 shows the third pairs among the multiple IoT devices in the implementation scenario. Compared with the sensing pairs (the second pairs) corresponding to the longer distance in FIG. 19, FIG. 20 shows the sensing pairs (the third pairs) among the IoT devices corresponding to the shorter distance. In the embodiment, the central control device 310 retains the sensing pairs satisfying the third feature condition (e.g., RSSI is greater than −40) as the third pairs (such as the sensing pairs A:D, A:E, B:C, and D:E). In other words, after the sensing pairs corresponding to the longer distance are used to detect and it is determined that the potential intrusion may occur, the central control device 310 then takes the sensing pairs corresponding to the shorter distance from the 10 sensing pairs of the IoT devices A, B, C, D, and E, that is, the sensing pairs A:D, A:E, B:C, and D:E are used to perform the sensing monitor (step S1535).

The central control device 310 sets the sensing schedule of the IoT devices A, B, C, D, and E, makes the IoT devices A, B, C, D, and E take turns playing the device role to perform paired sensing process and receives the sensing signals of the four sensing pairs. For example, in the first duration, the central control device 310 sets the IoT devices A, B and D as the STA mode and sets the IoT devices C and E as the AP mode, where the IoT device A connects to the IoT device E (on channel 36), the IoT device D connects to the IoT device E (on channel 44), and the IoT device B connects to the IoT device C (on channel 48). In the second duration, the central control device 310 sets IoT devices A the STA mode and sets the IoT devices D as the AP mode, where IoT device A connects to the IoT device D (on channel 52). After configurations, the central control device 310 receives the third sensing signals of the sensing pairs A:E, D:E, B:C, and A:D every 0.5 seconds (step S1540).

The central control device 310 continuously detects whether the third sensing signal satisfies the second abnormal condition. For example, the second abnormal condition is that the third sensing signal of any one of the third sensing pairs is continuously greater than the threshold 5 times. If the central control device 310 determines that the third sensing signal is continuously greater than the threshold 5 times in two seconds, it is determined that an intruder presents in the area of a specific sensing pair.

In steps 1535 to S1540, the central control device 310 uses the sensing pairs corresponding to the short distance to confirm the region of the intruder. In one embodiment, the central control device 310 may predefine all the space positions of the sensing pairs among the IoT devices A, B, C, D, and E in the implementation scenario. For example, the sensing pair A:D is on the left side of the bedroom 111 and the living room 117; the sensing pair B:C is on the right side of the bedroom 115 and the living room 117; the sensing pair B:E is across the toilet 113 and the bedroom 115. Therefore, the central control device 310 determines the intrusion area by detecting the third pairs that satisfy the second abnormal condition.

The central control device 310 obtains the multiple first pairs whose features satisfy the first feature condition from the sensing-pair list (such as Table 13), shown in Table 14. The first feature condition is satisfied when a feature is greater than the RSSI or CSI corresponding to the first distance or greater than the default ping value.

TABLE 14 the sensing-pair list (the first pair) (threshold: RSSI is −60)

| Sensing Pairs | Features (RSSI averages) | First Pair |
|---|---|---|
| D:E | −32 | Yes |
| A:E | −35 | Yes |
| A:D | −35 | Yes |
| B:C | −38 | Yes |
| C:E | −54 | Yes |
| B:E | −55 | Yes |
| C:D | −57 | Yes |
| A:B | −58 | Yes |
| A:C | −61 | No |
| B:D | −62 | No |

In one embodiment, the central control device 310 sets the sensing schedule of the IoT devices A, B, C, D, and E performing sensing in a time sharing fashion.

First, the central control device 310 counts the quantity of the first pairs of each IoT device, shown in Table 15.

TABLE 15 the sensing-pair quantity

| IoT devices | Sensing-pair Quantity |
|---|---|
| A | 3 |
| B | 3 |
| C | 3 |
| D | 3 |
| E | 4 |

Then, the central control device 310 finds all the sensing pairs of the IoT devices having the greatest sensing-pair quantity. In the embodiment, the central control device 310 finds all the sensing pairs A:E, B:E, C:E, and D:E of the IoT device E and updates the sensing-pair list, shown in Table 16.

TABLE 16

| the sensing-pair list (ordering the sensing pairs) | |
|---|---|
| Ordered Sensing Pair | Unordered Sensing pair |
| A:E | A:D |
| B:E | B:C |
| C:E | C:D |
| D:E | A:B |

The central control device 310 updates the sensing-pair quantity according to the unordered sensing pairs of Table 16, shown in Table 17.

TABLE 17

| the sensing-pair quantity | |
|---|---|
| IoT devices | Sensing-pair Quantity |
| A | 2 |
| B | 2 |
| C | 2 |
| D | 2 |
| E | 0 |

The central control device 310 finds the sensing pairs A:B and A:D of the IoT device A having the greatest sensing-pair quantity and updates the sensing-pair list, shown in Table 18.

TABLE 18

| the sensing-pair list (ordering the sensing pairs) | |
|---|---|
| Ordered Sensing Pairs | Unordered Sensing Pairs |
| A:E | B:C |
| B:E | C:D |
| C:E | |
| D:E | |
| A:B | |
| A:D | |

Because unordered sensing pairs remain in the sensing-pair list, the central control device 310 updates the sensing-pair quantity according to the unordered sensing pairs of Table 18, shown in Table 19.

TABLE 19

| the sensing-pair quantity | |
|---|---|
| IoT Devices | Sensing-pair Quantity |
| A | 0 |
| B | 1 |
| C | 2 |
| D | 1 |
| E | 0 |

The central control device 310 finds the sensing pairs B:C and C:D of the IoT device C having the greatest sensing-pair quantity and updates the sensing-pair list, shown in Table 20.

TABLE 20

| the sensing-pair list (ordering the sensing pairs) | |
|---|---|
| Ordered Sensing Pairs | Unordered Sensing Pairs |
| A:E | |
| B:E | |
| C:E | |
| D:E | |
| A:B | |
| A:D | |
| B:C | |
| C:D | |

At this time, all the sensing pairs are ordered. Then, the central control device 310 performs the intrusion detection incorporated with a dynamical timeshare sensing according to the ordered sensing pairs of Table 20, shown in Table 21.

TABLE 21

| the dynamical timeshare paired sensing (a set of the ordered sensing pair) | | |
|---|---|---|
| Dynamical Timeshare Sensing Pairs | AP | Sensing Duration |
| A:E | E | T1.1 |
| B:E | E | T1.2 |
| C:E | E | T1.3 |
| D:E | E | T1.4 |
| A:B | A | T2.1 |
| A:D | A | T2.2 |
| B:C | C | T3.1 |
| C:D | C | T3.2 |

It should be noted that the dynamical timeshared sensing pairs in Table 21 are the detailed time-sharing example of Table 14 (first pair: Yes).

The central control device 310 sets the sensing duration of the IoT devices A, B, C, D, and E according to the dynamic sensing schedule in a time sharing fashion.

Figure 21:
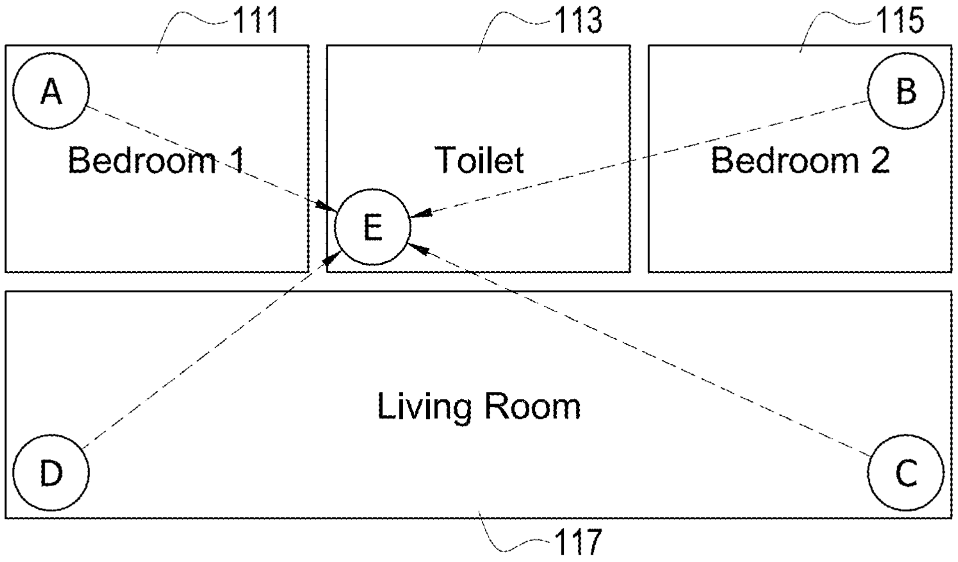
FIG. 21 is a schematic diagram of the sensing pairs of the IoT device E that is configured as the AP mode in a first duration.

FIG. 21 is a schematic diagram of the sensing pairs of the IoT device E that is configured as the AP mode in the first duration.

In the first duration T1, the IoT device E is the common sensing device, so the IoT device E is set as the AP mode to be the sender. Another sensing devices of the common sensing device of the first pair, that is, the IoT devices A, B, C, and D paired with the IoT device E, take turns performing paired sensing with the IoT device E according to the dynamic sensing time-sharing schedule: T1.1, T1.2, T1.3, and T1.4. For example, the IoT devices A, B, C, and D respectively send signals with the assigned transmission power to the IoT device E (the first sensing signal).

Figure 22:
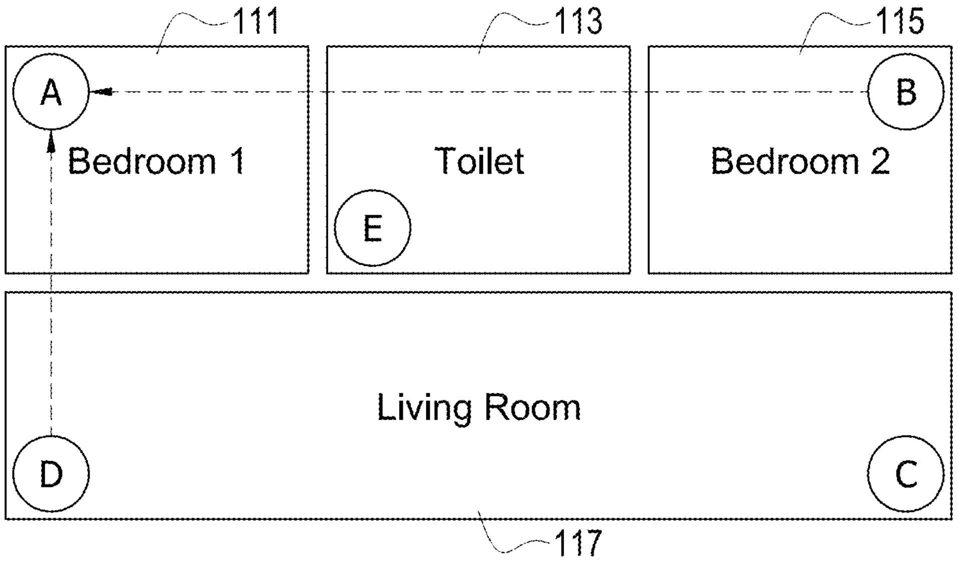
FIG. 22 is a schematic diagram of the sensing pairs of the IoT device A that is configured as the AP mode in a second duration.

FIG. 22 is a schematic diagram of the sensing pairs of the IoT device A that is configured as the AP mode in a second duration.

In the second duration T2, the IoT device A is the common sensing device, so the IoT device A is set as the AP mode to be the sender. Another IoT device of the common sensing device of the first pair, that is, the IoT devices B and D paired with the IoT device A, take turns performing paired sensing with the IoT device E according to the dynamic sensing time-sharing schedule: T2.1 and T2.2. For example, the IoT devices B and D respectively send signals with the assigned transmission power to the IoT device A (the first sensing signal).

Figure 23:
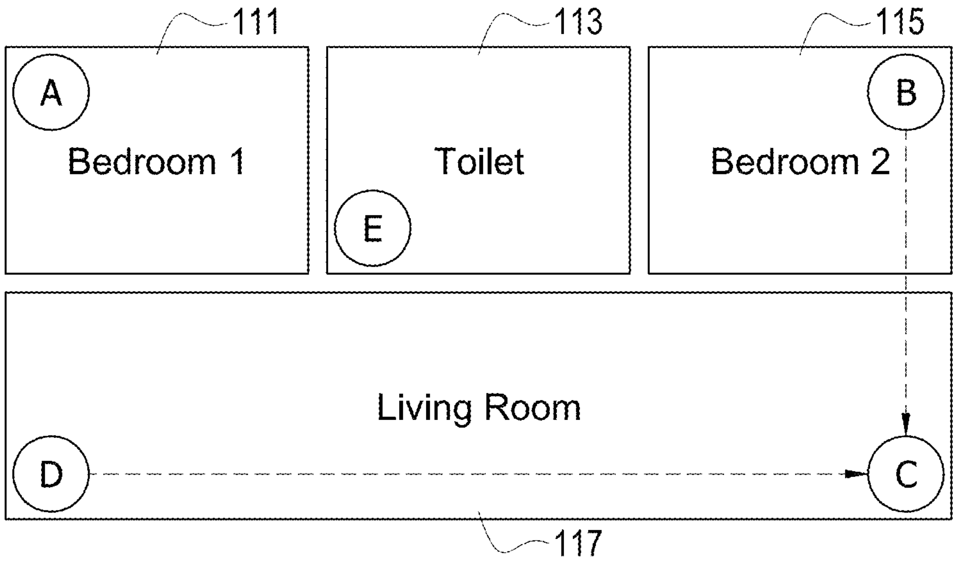
FIG. 23 is a schematic diagram of the sensing pairs of the IoT device C that is configured as the AP mode in a third duration.

FIG. 23 is a schematic diagram of the sensing pairs of the IoT device C that is configured as the AP mode in a third duration.

In the third duration T3, the IoT device C is the common sensing device, so the IoT device C is set as the AP mode to be the sender. Another sensing device of the common sensing device of the first pair, that is, the IoT devices B and D paired with the IoT device C, take turns performing paired sensing with the IoT device C according to the dynamic sensing time-sharing schedule: T3.1 and T3.2. For example, the IoT device B and D respectively send signals with the assigned transmission power to the IoT device C (first sensing signal).

The central control device 310 dynamically schedules the multiple IoT devices of the multiple first pairs to send and receive signals in a time sharing fashion to obtain the first sensing signals of each of the multiple first pairs (step S1555). The central control device 310 continuously detects whether any first sensing signal of the first pair satisfied the suspected intrusion condition (step S1560). The suspected intrusion condition may be that the quantity of the feature of the sensing pair that is greater than the threshold (e.g., RSSI is −60) is greater than a tolerance (such as 5 times).

If determining that the first sensing signal satisfies the suspected intrusion condition (step S1560), the first pair satisfying the suspected intrusion condition is tagged with the first status code (step S1570); otherwise, the first pair is tagged with the second status code (step S1565)

Figure 24:
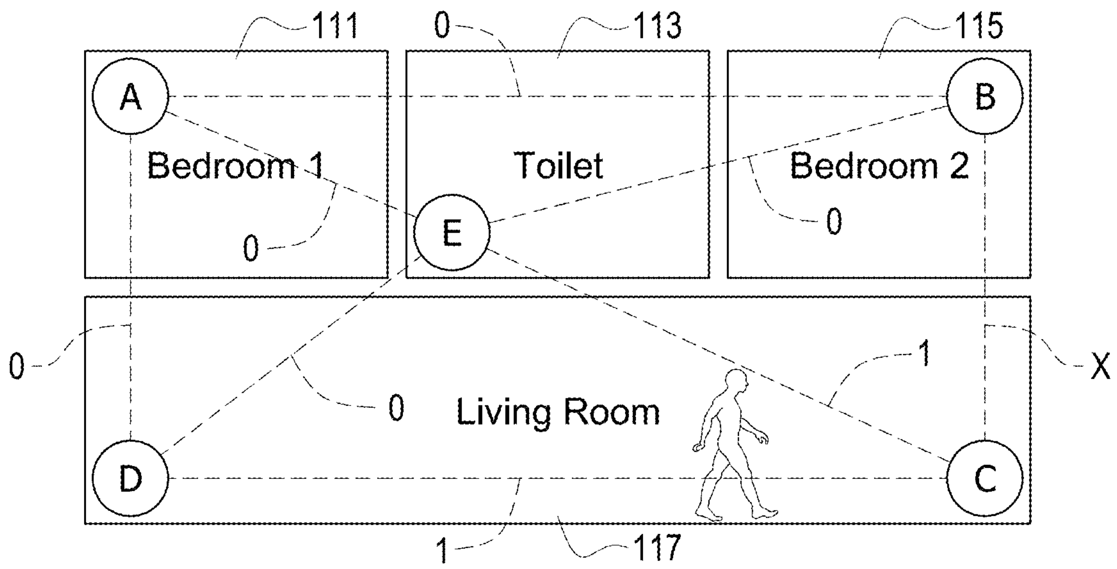
FIG. 24 is a schematic diagram of tagging all the first pairs according to one embodiment of the present disclosure.

FIG. 24 is a schematic diagram of tagging all the first pairs according to one embodiment of the present disclosure.

In one embodiment, the first status code is the numeral value 1, and the second status code is the numeral value 0.

The multiple IoT devices A, B, C, D, and E are disposed in the implementation scenario. At one checking point, the central control device 310 counts the first status code of the first pair to which each paired node belongs (step S1575). For example, the central control device 310 respectively counts the value (the first status code or the second status code) of each edge (the first pair) to which the IoT devices A, B, C, D, and E (paired nodes) belong.

If determining that at least one of the multiple first pairs to which each paired node belongs is the second status code (step S1580), the central control device 310 determines that no intrusion condition occurs at the space position close to the paired node (step S1582).

If determining that all of the multiple first pairs of the paired node are tagged with the first status code and one of the multiple adjacent-node pairs of another one of the paired node that belongs to one of the multiple first pairs is tagged with the second status code (step S1585), the central control device 310 determines that the intrusion condition occurs at the space position close to the paired node (step S1857).

If determining it is a condition other than that of step S1580 or step S1585, the central control device 310 determines that the space position close to the paired node occurs the suspected intrusion condition (step S1592).

In one embodiment, the central control device 310 uses the three intrusion classifications above (step S570 of FIG. 5 or steps S1580, S1585, and S1590 of FIG. 16) to determine that the space position close to the paired node is: no intrusion, indeed intrusion, or suspected intrusion.

As shown in FIG. 24, the values of the three edges of the paired node C (i.e., the IoT device C) are X (the sensing pair C: B), 1 (the sensing pair C:E), and 1 (the sensing pair C:D) respectively.

When the value X of the sensing pair C: B is 0, one (i.e., the sensing pair C: B) of the first pairs of the paired node C is tagged with the second status code (the first classification: at least one of the multiple first pairs that the paired node belongs is tagged with the second status code). Therefore, the central control device 310 determines that no intrusion condition occurs at the space position close to the IoT device A.

When the value X of the sensing pair C: B is 1, three values of the edges of the paired node C (i.e., the IoT device C) are 1, representing that all the first pairs of the paired node C are tagged with the first status code. Then, one (e.g., the first pair B:C) of the three first pairs of the paired node C is selected to examine another node (e.g., the paired node B) of the first pair B:C, where the paired node B has three first pairs (e.g., the sensing pairs B: A, B:E, and B:C) and one (e.g., the sensing pair B: A) of the three first pairs is tagged with the second status code (the second classification: all the first pairs of the paired node are tagged with the first status code, and one pair of the multiple first pairs of the paired node has another paired node, the another paired node has multiple adjacent-node pairs and one pair of the multiple adjacent-node pairs is tagged with the second status code). Therefore, the central control device 310 determines that the suspected intrusion condition occurs at the space position close to the IoT device C.

To each paired node, if the central control device 310 determines that the paired node does not satisfy any of the first classification and the second classification (i.e., satisfying the third classification), it represents that the suspected intrusion condition occurs at the space position close to the paired node.

After confirming the status code of all the first pairs of all the paired nodes A, B, C, D, and E, the central control device 310 determines that the intrusion condition occurs at the left-right corner of the living room 117 (the IoT device C). Therefore, the central control device 310 sends a warning message to prompt the user to care about the intrusion region.

Figure 25:
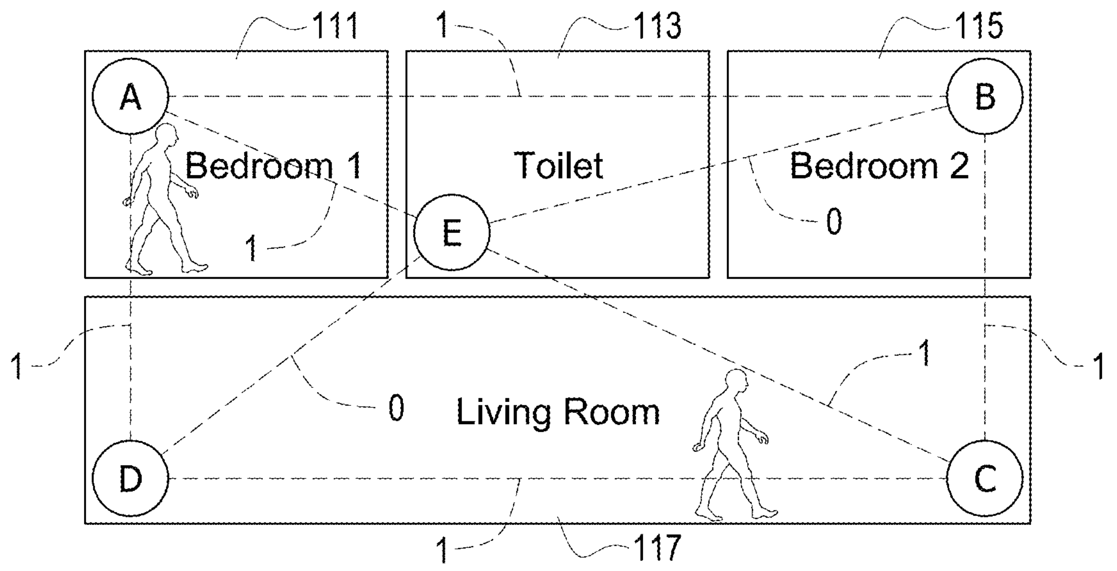
FIG. 25 is a schematic diagram of tagging all the first pairs according to another embodiment of the present disclosure.

FIG. 25 is a schematic diagram of tagging all the first pairs according to another embodiment of the present disclosure.

The central control device 310 determines the status code of all the first pairs of all the paired nodes A, B, C, D, and E. In the embodiment, the central control device 310 confirms that all the first pairs of the paired nodes A and C are tagged with the first status code (i.e., the value 1). Therefore, the central control device 310 detects that the intrusion occurs at the bedroom 111 (the region of the IoT device A) and the right corner of the living room 117 (the region of the IoT device C).

No matter how many IoT devices are disposed in the implementation scenario, the central control device 310 detects the possibility of 0-T intruders by determining whether the status code of each of all the first pairs is the first status code, where T (a positive integer) is the quantity of the IoT devices disposed in the implementation scenario.

Figure 26:
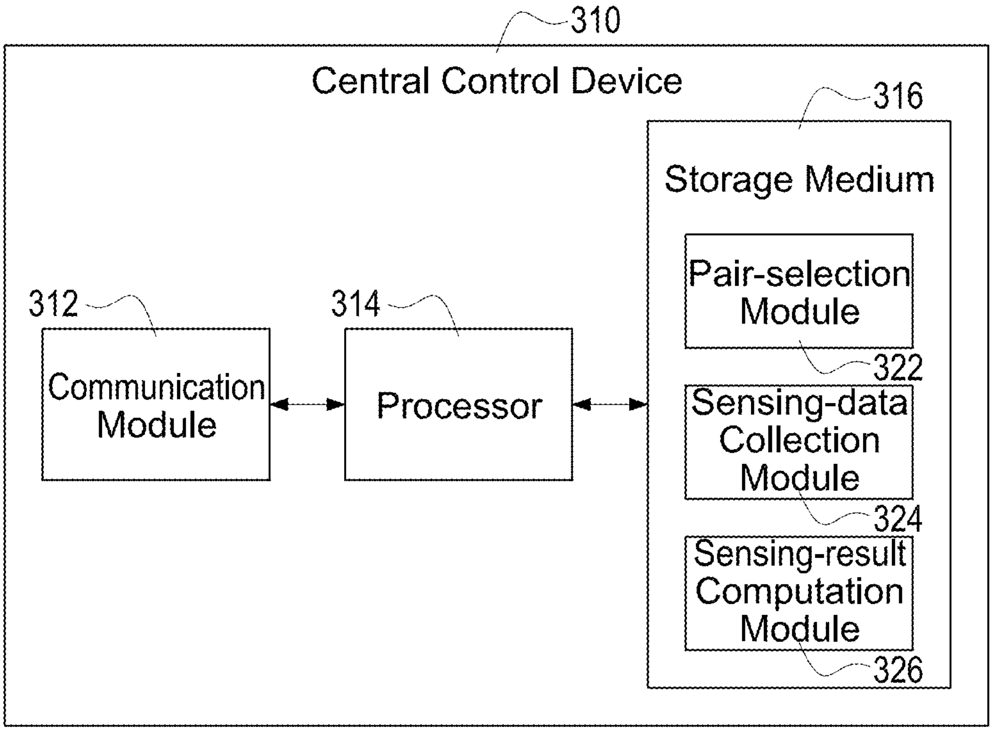
FIG. 26 is a block diagram of the central control device according to one embodiment of the present disclosure.

FIG. 26 is a block diagram of the central control device according to one embodiment of the present disclosure.

The central control device 310 includes a communication module 312, a processor 314, and a storage medium 316. The processor 314 is respectively connected to the communication module 312 and the storage medium 316.

The storage medium 316 includes multiple program codes, and functions of these program codes include a pair-selection module 322, a sensing-data collection module 324, and a sensing-result computation module 326. After the multiple program codes are loaded into the processor 314, the processor 314 executes the pair-selection module 322, the sensing-data collection module 324, and the sensing-result computation module 326.

The pair-selection module 322 is applied to set the device role to each IoT device and set the sensing pair among the multiple IoT devices 330.

The sensing-data collection module 324 is applied to collect the sensing signal of each IoT device 330 with the sensing pair and obtain the feature of the sensing signal.

The sensing-result computation module 326 is applied to compute the intrusion condition in the implementation scenario.

Figure 27:
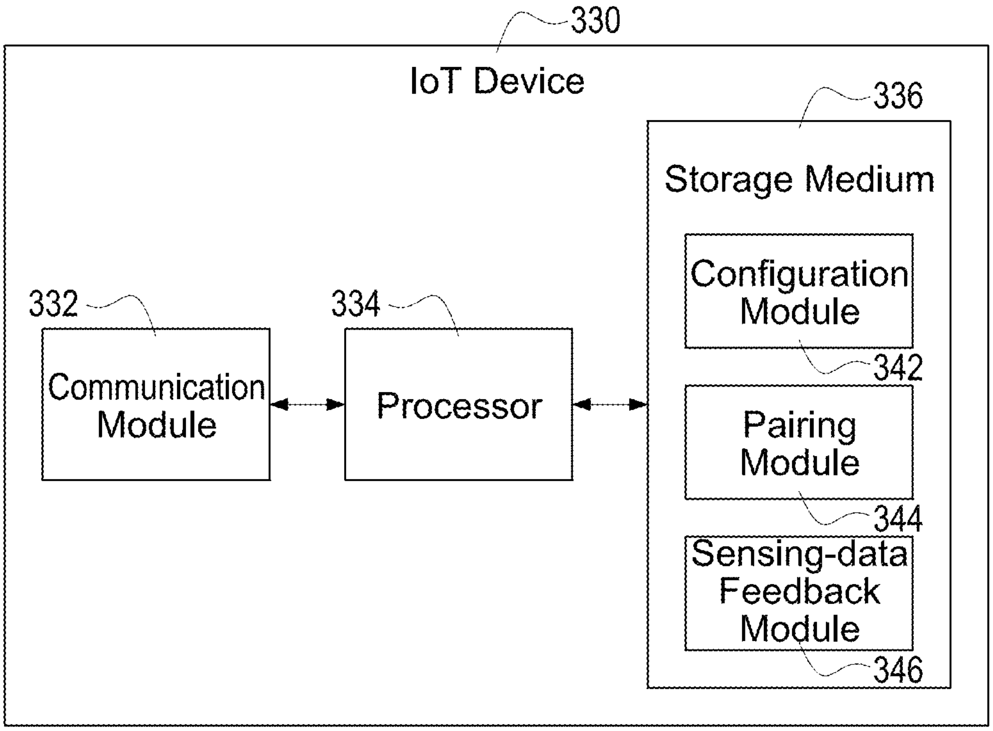
FIG. 27 is a block diagram of the IoT device according to one embodiment of the present disclosure.

FIG. 27 is a block diagram of the IoT device according to one embodiment of the present disclosure.

The IoT device 333 includes a communication module 332, a processor 334, and a storage medium 336. The processor 334 is respectively connected to the communication module 332 and the storage medium 336.

The storage medium 336 includes multiple program codes, and functions of these program codes include a configuration module 342, a pairing module 344, and a sensing-data feedback module 346. After the multiple program codes are loaded into the processor 334, the processor 334 executes the configuration module 342, the pairing module 344, and the sensing-data feedback module 346.

The IoT devices 333 may be connected to the other IoT device and the central control device 310 through the communication module 332.

The configuration module 342 is applied to use the sensing schedule received from the central control device 310 to perform the configuration.

The pairing module 344 is applied to establish the sensing pair with other IoT devices according to the configuration.

The sensing-data feedback module 346 is applied to measure the sensing signal and send the feedback of the sensing signal to the central control device 310 through the communication module 332.

In one embodiment, the communication modules 312 and 332 may be but is not limited to a chip complied with the Global System for Mobile communication (GSM), the Long Term Evolution (LTE), the fifth generation (5G) network system, the Wireless Fidelity (Wi-Fi), IEEE 802.11, the Bluetooth, the wired network communication, or any combination of the elements above.

In one embodiment, the processors 314 and 334 may be but are not limited to the microprocessor, the Digital Signal Processors (DSP), the Application Specific Integrated Circuit (ASIC), the central processing unit (CPU), the System on Chip (SoC), the Field Programmable Gate Array (FPGA), the network processor chip, or any combination of the elements above.

In one embodiment, the storage medium 316 and 336 may be but are not limited to the Random Access Memory (RAM), the Flash memory, the Read Only Memory (ROM), the Hard Disk Drive (HDD), the Solid State Drive (SSD), the optical storage, or any combination of the elements above.

In summary, the intrusion detection system and method provided in the disclosure do not restrict the pairing mode of sensing devices, and any sensing device can be regarded as a node for the intrusion detection. Therefore, the technical features provided by the disclosure solve the problem of limited detection coverage and blind spots in detection without additional hardware costs.

Furthermore, the technical features of the present disclosure combine the sensing pairs of long-distance (wide coverage) and short-distance (narrow coverage). Initially, the long-distance sensing pair is used to preliminarily assess potential intrusion over a wide area (whether any intruders are present). If a potential intrusion is detected within a wide coverage, further assessment is then conducted within a narrow coverage to determine the precise position of the intruder. The technical features of the present disclosure resolve the problem related to response time delays and enhance the accuracy of intrusion detection.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An intrusion detection system, comprising:

multiple IoT devices, each of the IoT devices disposed respectively on a space position and configured to receive and send a sensing signal; and a central control device, communicatively connected to the multiple IoT devices and configured to:

obtain multiple sensing pairs from a paired combination of the multiple IoT devices;

make the multiple IoT devices of each of the multiple sensing pairs send and receive signals to obtain features of the multiple sensing pairs;

create a sensing-pair list comprising the multiple sensing pairs and the features of each of the multiple sensing pairs;

obtain multiple first pairs whose features satisfy a first feature condition from the sensing-pair list;

schedule dynamically the multiple IoT devices of the multiple first pairs to send and receive signals in a time sharing fashion to obtain a first sensing signal of each of the multiple first pairs;

if determining that the first sensing signal satisfies a suspected intrusion condition, tag the first pair with a first status code, otherwise tag the first pair with a second status code; and based on a paired node of the multiple first pairs, count respectively the first status codes and the second status codes of the multiple first pairs that the paired node belongs, to determine whether any intrusion condition occurs at the space position close to the paired node.

2. The intrusion detection system of claim 1, wherein the central control device obtains the multiple first pairs wherein features satisfy the first feature condition from the sensing-pair list, further configured to:

obtain multiple second pairs from the sensing-pair list according to the features satisfying a second feature condition;

make the multiple IoT devices of the multiple second pairs send signals to obtain a second sensing signal of each of the multiple second pairs;

detect continuously whether the second sensing signal satisfies a first abnormal condition; and when determining that the second sensing signal does not satisfy the first abnormal condition, continuously receive and detect the second sensing signal.

3. The intrusion detection system of claim 2, wherein the central control device determines that the second sensing signal satisfies the first abnormal condition, configured to:

obtain multiple third pairs from the sensing-pair list according to the features satisfying a third feature condition;

make the multiple IoT devices of the multiple third pairs send signals to obtain a third sensing signal of each of the multiple third pairs;

detect continuously whether the third sensing signal satisfies a second abnormal condition; and when determining that the third sensing signal does not satisfy the second abnormal condition, continuously receive and detect the third sensing signal.

4. The intrusion detection system of claim 3, wherein the central control device determines that the third sensing signal satisfies the second abnormal condition, configured to:

obtain the multiple first pairs from the sensing-pair list according to the features satisfying the first feature condition, to dynamically schedule the multiple IoT devices of the first pairs to send signals in a time sharing fashion.

5. The intrusion detection system of claim 3, wherein the features of each of the multiple sensing pairs comprise an RSSI, a CSI, and a ping value, wherein the first feature condition is satisfied when a feature is greater than the RSSI or the CSI corresponding to a first distance, or greater than a default ping value, and the second feature condition is satisfied when a feature is smaller than the RSSI or the CSI corresponding to a second distance or smaller than the default ping value, wherein the first distance is greater than the second distance.

6. The intrusion detection system of claim 2, wherein the central control device obtains the multiple second pairs from the sensing-pair list according to the features satisfying the second feature condition, configured to:

order the feature of each of the multiple sensing pairs from least to greatest based on the multiple sensing pairs; and create or update the sensing-pair list by the multiple sensing pairs and the feature of each of the multiple sensing pairs ordered.

7. The intrusion detection system of claim 1, wherein operations of the central control device obtaining the multiple first pairs wherein features satisfy the first feature condition from the sensing-pair list comprise:

counting a sensing-pair quantity of each of the multiple IoT devices from the multiple sensing pairs, ordering the multiple sensing pairs based on the sensing-pair quantity from greatest to least, and updating the sensing-pair list by the multiple sensing pairs and the feature of each of the multiple sensing pairs ordered; and obtaining the multiple first pairs wherein features satisfy the first feature condition from the sensing-pair list updated.

8. The intrusion detection system of claim 1, wherein the central control device is configured to determine intrusion classifications according to a count of status codes of the multiple first pairs: (1) wherein at least one of the multiple first pairs of the paired node is tagged with the second status code, determining that no intrusion condition occurs at the space position close to the paired node; (2) wherein all of the multiple first pairs of the paired node are tagged with the first status code and one of multiple adjacent-node pairs of another one of the paired nodes that belongs to one of the multiple first pairs is tagged with the second status code, determining that the intrusion condition occurs at the space position close to the paired node; (3) otherwise, determining that a suspected intrusion condition occurs at the space position close to the paired node.

9. The intrusion detection system of claim 1, wherein operations of the central control device obtaining the multiple sensing pairs from the paired combination of the multiple IoT devices comprise:

detecting a device identifier of the multiple IoT devices; and setting a sensing schedule of the multiple IoT devices based on the device identifier, and obtaining the multiple sensing pairs of the multiple IoT devices when the multiple IoT devices send and receive signals by taking turns playing a device role according to the sensing schedule.

10. The intrusion detection system of claim 9, wherein the device role comprises a station mode, an access point mode, and a sniffer mode.

11. An intrusion detection method, applying to multiple IoT devices and a central device, each of the multiple IoT devices being disposed on a space position and configured to send and receive a sensing signal, the central control device connected to the multiple IoT devices receiving the sensing signal, and the intrusion detection method comprising:

obtaining multiple sensing pairs from a paired combination of the multiple IoT devices;

making the multiple IoT devices of each of the multiple sensing pairs send and receive signals to obtain features of the multiple sensing pairs;

creating a sensing-pair list comprising the multiple sensing pairs and the features of each of the multiple sensing pairs;

obtaining multiple first pairs whose features satisfy a first feature condition from the sensing-pair list;

scheduling dynamically the multiple IoT devices of the multiple first pairs to send and receive signals in a time sharing fashion to obtain a first sensing signal of each of the multiple first pairs;

if determining that the first sensing signal satisfies a suspected intrusion condition, tagging the first pair with a first status code, otherwise tagging with a second status code; and based on a paired node of the multiple first pairs, counting respectively the first status code and the second status code of the multiple first pairs that the paired node belongs, to determine whether any intrusion condition occurs at the space position close to the paired node.

12. The intrusion detection method of claim 11, wherein obtaining the multiple first pairs wherein features satisfy the first feature condition from the sensing-pair list comprises:

obtaining multiple second pairs from the sensing-pair list according to the features satisfying a second feature condition;

making the multiple IoT devices of the multiple second pairs send signals to obtain a second sensing signal of each of the multiple second pairs;

detecting continuously whether the second sensing signal satisfies a first abnormal condition; and when determining that the second sensing signal does not satisfy the first abnormal condition, continuously receiving and detect the second sensing signal.

13. The intrusion detection method of claim 12, wherein determining that the second sensing signal satisfies the first abnormal condition, comprising:

obtaining multiple third pairs from the sensing-pair list according to the features satisfying a third feature condition;

making the multiple IoT devices of the multiple third pairs send signals to obtain a third sensing signal of each of the multiple third pairs;

detecting continuously whether the third sensing signal satisfies a second abnormal condition; and when determining that the third sensing signal does not satisfy the second abnormal condition, continuously receive and detect the third sensing signal.

14. The intrusion detection method of claim 13, wherein determining that the third sensing signal satisfies the second abnormal condition, comprising:

obtaining the multiple first pairs from the sensing-pair list according to the features satisfying the first feature condition, to dynamically schedule the multiple IoT devices of the first pairs to send signals in a time sharing fashion.

15. The intrusion detection method of claim 13, wherein the features of each of the multiple sensing pairs comprise an RSSI, a CSI, and a ping value, wherein the first feature condition is satisfied when a feature is greater than the RSSI or the CSI corresponding to a first distance, or greater than a default ping value, and the second feature condition is smaller than the RSSI or the CSI corresponding to a second distance or smaller than the default ping value, wherein the first distance is greater than the second distance.

16. The intrusion detection method of claim 12, wherein obtaining the multiple second pairs from the sensing-pair list according to the features satisfying the second feature condition comprise:

ordering the feature of each of the multiple sensing pairs from least to greatest based on the multiple sensing pairs; and creating or updating the sensing-pair list by the multiple sensing pairs and the feature of each of the multiple sensing pairs ordered.

17. The intrusion detection method of claim 11, wherein steps of obtaining the multiple first pairs whose features satisfy the first feature condition from the sensing-pair list comprise:

counting a sensing-pair quantity of each of the multiple IoT devices from the multiple sensing pairs, ordering the multiple sensing pairs based on the sensing-pair quantity from greatest to least, and updating the sensing-pair list by the multiple sensing pairs and the feature of each of the multiple sensing pairs ordered; and obtaining the multiple first pairs whose features satisfy the first feature condition from the sensing-pair list updated.

18. The intrusion detection method of claim 11, further comprising steps of determining intrusion classifications according to a count of status codes of the multiple first pairs: (1) wherein at least one of the multiple first pairs of the paired node is tagged with the second status code, determining that no intrusion condition occurs at the space position close to the paired node; (2) wherein all of the multiple first pairs of the paired node are tagged with the first status code and one of multiple adjacent-node pairs of another one of the paired node that belongs to one of the multiple first pairs is tagged with the second status code, determining that the intrusion condition occurs at the space position close to the paired node; (3) otherwise, determining that a suspected intrusion condition occurs at the space position close to the paired node.

19. The intrusion detection method of claim 11, wherein steps of obtaining the multiple sensing pairs from the paired combination of the multiple IoT devices comprise:

detecting a device identifier of the multiple IoT devices; and setting a sensing schedule of the multiple IoT devices based on the device identifier, and obtaining the multiple sensing pairs of the multiple IoT devices when the multiple IoT devices send and receive signals by taking turns playing a device role according to the sensing schedule.

20. The intrusion detection method of claim 19, wherein the device role comprises a station mode, an access point mode, and a sniffer mode.

* * * * *